United States Patent
Qi et al.

(10) Patent No.: US 10,299,302 B2
(45) Date of Patent: May 21, 2019

(54) APPARATUS, SYSTEM AND METHOD OF PEER-TO-PEER CONNECTION SESSION SETUP

(71) Applicant: INTEL IP CORPORATION, Santa Clara, CA (US)

(72) Inventors: Emily H. Qi, Gig Harbor, WA (US); Elad Levy, Rishon LeZion (IL); Idan Maor, Tel Aviv (IL)

(73) Assignee: INTEL IP CORPORATION, Santa Clara, CA (US)

( * ) Notice: Subject to any disclaimer, the term of this patent is extended or adjusted under 35 U.S.C. 154(b) by 259 days.

(21) Appl. No.: 15/199,485

(22) Filed: Jun. 30, 2016

(65) Prior Publication Data
US 2017/0257900 A1    Sep. 7, 2017

Related U.S. Application Data

(60) Provisional application No. 62/301,754, filed on Mar. 1, 2016, provisional application No. 62/318,872, filed on Apr. 6, 2016.

(51) Int. Cl.
| | |
|---|---|
| H04W 76/10 | (2018.01) |
| H04W 76/14 | (2018.01) |
| H04W 76/18 | (2018.01) |
| H04W 76/11 | (2018.01) |
| H04L 29/12 | (2006.01) |

(52) U.S. Cl.
CPC ......... *H04W 76/14* (2018.02); *H04L 61/6004* (2013.01); *H04L 61/6022* (2013.01); *H04W 76/11* (2018.02); *H04W 76/18* (2018.02)

(58) Field of Classification Search
None
See application file for complete search history.

(56) References Cited

U.S. PATENT DOCUMENTS

| | | | |
|---|---|---|---|
| 7,813,744 B2 * | 10/2010 | Johnson | H04W 36/30 455/464 |
| 9,609,676 B1 * | 3/2017 | Bijwe | H04W 8/005 |
| 2009/0017861 A1 * | 1/2009 | Wu | H04W 52/246 455/522 |
| 2014/0211705 A1 | 7/2014 | Baek | |
| 2015/0049684 A1 | 2/2015 | Kim et al. | |

(Continued)

FOREIGN PATENT DOCUMENTS

| | | |
|---|---|---|
| WO | 2007044597 | 4/2007 |

OTHER PUBLICATIONS

International Search Report and Written Opinion for PCT/US2017/015743, dated Apr. 28, 2017, 16 pages.

(Continued)

*Primary Examiner* — Kenny S Lin
(74) *Attorney, Agent, or Firm* — Shichrur & Co.

(57) ABSTRACT

Some demonstrative embodiments include apparatuses, devices, systems and methods peer-to-peer connection session setup. For example, a first peer-to-peer device may set a waiting timer to count a waiting period during a connection session setup of a session with a second peer-to-peer device; and during the waiting period, check whether the second peer-to-peer device is in the connection session setup by transmitting a probe request to the second peer-to-peer device, the probe request including an Information (Info) attribute.

24 Claims, 8 Drawing Sheets

(56) References Cited

U.S. PATENT DOCUMENTS

| | | | | |
|---|---|---|---|---|
| 2015/0127843 A1* | 5/2015 | Karaoguz | ............... | H04L 45/00 |
| | | | | 709/228 |
| 2015/0264514 A1* | 9/2015 | Qi | ........................... | H04W 4/70 |
| | | | | 370/338 |
| 2015/0305070 A1 | 10/2015 | Ahmad | | |
| 2015/0351146 A1 | 12/2015 | Lee et al. | | |
| 2015/0382287 A1* | 12/2015 | Kim | ..................... | H04W 76/14 |
| | | | | 370/338 |
| 2016/0343346 A1* | 11/2016 | Lee | ........................ | G09G 5/005 |
| 2017/0290067 A1* | 10/2017 | Cohn | ............... | H04W 52/0209 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Peer-to-Peer (P2P), Technical Specification, Version 1.5, 2014, Aug. 4, 2014, 183 pages.
Wi-Fi Peer to-Peer Services (P2Ps) Technical Specification (for Wi-Fi Direct® services certification) Version 1.1, Aug. 21, 2014, 100 pages.
International Preliminary Report on Patentability for International Application No. PCT/US2017/015743, dated Sep. 13, 2018, 11 pages.

* cited by examiner

APPARATUS, SYSTEM AND METHOD OF PEER-TO-PEER CONNECTION SESSION SETUP

CROSS REFERENCE

This application claims the benefit of and priority from U.S. Provisional Patent Application No. 62/301,754 entitled "APPARATUS, SYSTEM AND METHOD OF SIGNALING A STATUS OF A PEER-TO-PEER DEVICE", filed Mar. 1, 2016, and U.S. Provisional Patent Application No. 62/318,872 entitled "APPARATUS, SYSTEM AND METHOD OF PEER-TO-PEER CONNECTION SESSION", filed Apr. 6, 2016, the entire disclosures of both of which Applications are incorporated herein by reference.

TECHNICAL FIELD

Embodiments described herein generally relate to peer-to-peer connection session setup.

BACKGROUND

Some communication protocols, for example, according to a Wi-Fi Direct Services Specification, may provide a Peer-to-Peer connectivity, for example, to allow users to connect their devices in an easy and/or convenient manner, e.g., to share, show, print, and/or synchronize content.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
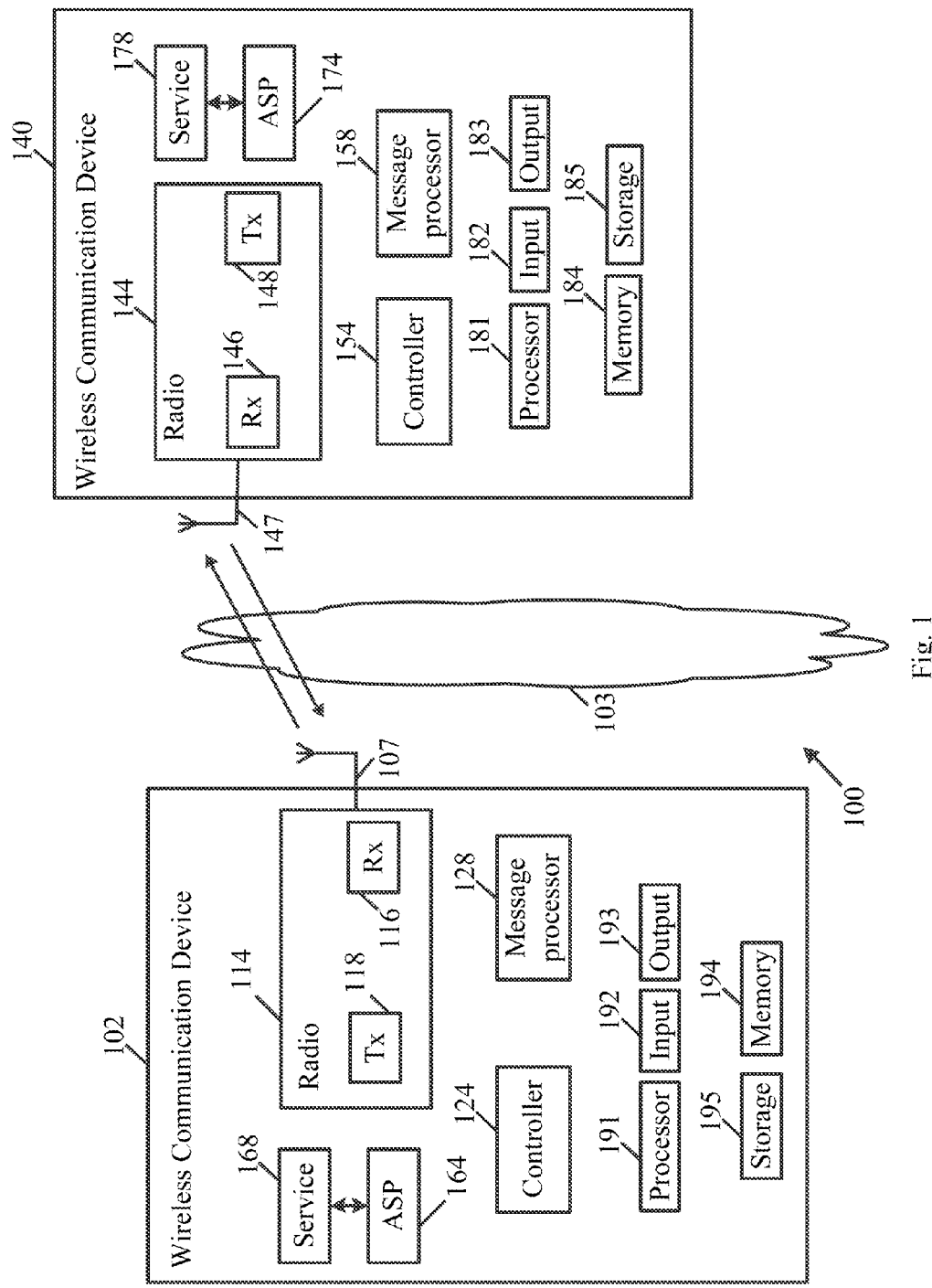
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wi-Fi Alliance (WFA) Specifications, devices and/or networks operating in accordance with existing WFA Peer-to-Peer (P2P) specifications (including WiFi P2P technical specification, version 1.5, Aug. 4, 2014; Application Service Platform 2 (ASP2) Technical Specification; Wi-Fi Peer-to-Peer Services (P2Ps) Technical Specification (for Wi-Fi Direct® services certification) Version 1.1, Aug. 21, 2014) and/or future versions and/or derivatives thereof, devices and/or networks operating in accordance with existing IEEE 802.11 standards (including IEEE 802.11-2012 (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012); IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE 802.11ax (IEEE 802.11ax, High Efficiency WLAN (HEW)); IEEE802.11-ay (P802.11 ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz); and/or IEEE 802.11az (IEEE 802.11az: Next Generation Positioning)) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 or 5 Gigahertz (GHz). However, other embodiments may be implemented utilizing any other suitable wireless communication frequency bands, for example, a 60 GHz band, a millimeterWave (mmWave) frequency band, a Sub 1 GHz (S1G) frequency band, a WLAN frequency band, a WPAN frequency band, and the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of, one or more STAs. For example, device 102 may include at least one STA, and/or device 140 may include at least one STA.

In some demonstrative embodiments, device 102 and/or device 140 may include, operate as, and/or perform the functionality of, one or more WLAN STAs.

In some demonstrative embodiments, device 102 and/or device 140 may include, operate as, and/or perform the functionality of, one or more Wi-Fi STAs.

In some demonstrative embodiments, device 102 and/or device 140 may include, operate as, and/or perform the functionality of, one or more BT devices.

In some demonstrative embodiments, device 102 and/or device 140 may include, operate as, and/or perform the functionality of, one or more Neighbor Awareness Networking (NAN) STAs.

In some demonstrative embodiments, devices 102 and/or 140 may include, operate as, and/or perform the functionality of, one or more Application Service Platform (ASP) devices, e.g., ASP Version 2 (ASP2) devices.

In some demonstrative embodiments, devices 102 and/or 140 may include, operate as, and/or perform the functionality of one or more location measurement STAs.

In some demonstrative embodiments, device 102 and/or device 140 may include, operate as, and/or perform the functionality of any other devices and/or STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a channel over a 2.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (S1G) frequency band, and/or any other channel over any other band.

In some demonstrative embodiments, wireless communication devices 102 and/or 140 may form, and/or communicate as part of, a wireless local area network (WLAN).

In some demonstrative embodiments, wireless communication devices 102 and/or 140 may form, and/or communicate as part of, a WiFi network.

In some demonstrative embodiments, wireless communication devices 102 and/or 140 may form, and/or communicate as part of, a WiFi Direct (WFD) network, e.g., a WiFi direct services (WFDS) network, and/or may perform the functionality of one or more WFD devices.

In other embodiments, wireless communication devices 102 and/or 140 may form, and/or communicate as part of, any other network and/or perform the functionality of any other wireless devices or stations.

In some demonstrative embodiments, wireless communication medium 103 may include a direct link, for example, a PTP link, e.g., a WiFi direct P2P link or any other PTP link, for example, to enable direct communication between wireless communication devices 102 and/or 140.

In some demonstrative embodiments, wireless communication devices 102, and/or 140 may perform the functionality of WFD P2P devices. For example, devices 102 and/or 140 may be able to perform the functionality of a P2P client device, and/or P2P group Owner (GO) device.

In other embodiments, wireless communication devices 102 and/or 140 may form, and/or communicate as part of, any other network, and/or may perform the functionality of any other wireless devices or stations.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 may be configured to communicate over a WLAN channel, and/or radio 144 may include a radio 144 to communicate over the WLAN channel.

For example, radios 114 and/or 144 may be configured to communicate over a WLAN link, a WiFi link, a Point to Point (PTP) link, a WiFi Direct (WFD) link, a Wireless Gigabit (WiGig) link, and/or any other link.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102 and/or 140 may be configured to communicate according to a peer-to-peer protocol, e.g., in accordance with a WiFi Direct Services Specification and/or any other specification, which may provide a Peer-to-Peer connectivity, for example, to allow users to connect their devices in an easy and/or convenient manner, e.g., to share, show, print, and/or synchronize content.

In some demonstrative embodiments, devices 102 and/or 140 may be configured to provide one or more services to one or more remote devices. For example, device 102 may be configured to provide printing services, display services, Internet access services and/or any other services to device 140.

In some demonstrative embodiments, devices 102 and/or 140 may be configured to advertize the one or more services, for example, to enable the remote devices to find the services. For example, device 102 may be configured to advertise one or more of the services provided by device 102 to enable device 140 to discover the services provided by device 102.

In some demonstrative embodiments, devices 102 and/or 140 may be configured to utilize the one or more services from the remote devices. For example, device 140 may be configured to utilize the services from device 102.

In some demonstrative embodiments, devices 102 and/or 140 may be configured to connect to a device to receive the service provided by the device. For example, device 140 may be configured to connect to device 102 to receive the services provided by device 102.

In some demonstrative embodiments, devices 102 and 140 may establish a P2P connection between devices 102 and 140 over wireless communication medium 103 to connect between devices 102 and 140, and to provide the one or more services between devices 102 and 140.

In some demonstrative embodiments, devices 102 and 140 may establish any other additional or alternative connection between devices 102 and 140 over wireless communication medium 103.

In some demonstrative embodiments, devices 102 and/or 140 may include an Application Service Platform (ASP) configured to manage the procedure of receiving and/or providing the one or more services, e.g., according to a predefined protocol.

In some demonstrative embodiments, device 102 may include an ASP 164, and/or device 140 may include an ASP 174, configured to manage an ASP-session between devices 102 and 140.

In some demonstrative embodiments, controller 124 may be configured to perform one or more operations and/or functionalities of ASP 164 and/or to cause a wireless station implemented by device 102 to perform one or more operations and/or functionalities of ASP 164.

In some demonstrative embodiments, controller 154 may be configured to perform one or more operations and/or functionalities of ASP 174 and/or to cause a wireless station implemented by device 140 to perform one or more operations and/or functionalities of ASP 174.

In some demonstrative embodiments, ASP 164 and/or ASP 174 may include, for example, a software module and/or a library module that implements functions required for managing the procedure of receiving and/or providing the one or more services. For example, the functions may include discovery of a service, session management, connection topology management, security management and/or any other function to support management of the services.

In some demonstrative embodiments, ASP 164 and/or ASP 174 may be configured to establish one or more ASP sessions between devices 102 and 140 over the P2P connection. An ASP session may be utilized, for example, to provide the one or more services between devices 102 and 140.

In some demonstrative embodiments, an ASP session between devices 102 and 140 may include a logical link between ASP 144 and ASP 174, e.g., over a P2P connection between devices 102 and 140. The ASP session may be configured, for example, to allow to manage the procedure of providing a service between devices 102 and 140.

In some demonstrative embodiments, the ASP session may be identified by an identifier ("ASP-session identifier"), e.g., as described below.

In some demonstrative embodiments, the ASP-session identifier may be unique, e.g., different, for every ASP session. For example, a first ASP session may be identified by a first ASP-session identifier, and a second ASP session may be identified by a second, ASP-session identifier e.g., different from the first ASP-session identifier.

In some demonstrative embodiments, the ASP-session identifier may include a combination of one or more elements to identify, e.g., uniquely identify, the ASP session.

In some demonstrative embodiments, the ASP-session identifier may include a combination of a session media access control (MAC) address and a session identifier.

In some demonstrative embodiments, the session MAC address may include, for example, a MAC address of a device initiating the ASP session (also referred to as "the seeker device").

In some demonstrative embodiments, the session identifier may include, for example, a value generated by the seeker device.

In some demonstrative embodiments, the seeker device may generate a different, e.g., unique, value for the session identifier, for example, for every ASP session initiated by the seeker device. Accordingly, the combination of the unique value for the session identifier and the session MAC address may uniquely form the ASP-session identifier for every ASP session.

In one example, ASP 164 and ASP 174 may establish a first ASP session over a P2P connection to provide a first service between devices 102 and/or 140, e.g., a printing service; a second ASP session over the P2P connection to provide a second, e.g., different, service between devices 102 and/or 140, e.g., a display service; and/or one or more other additional or alternative ASP sessions over the P2P connection to provide one or more other additional or alternative services between devices 102 and/or 140. According to this example, each ASP session may be identified by a combination of different unique session identifier generated by device 140 and the MAC address of device 140, for example, if device 140 initiates the ASP sessions.

In other embodiments, the ASP-session identifier may include any other identifier and/or may be based on one or more other additional or alternative values.

In some demonstrative embodiments, device 102 may include at least one service 168, e.g., a printing service and/or any other service, to be provided to another device, e.g., device 140.

In some demonstrative embodiments, service 168 may include a logical entity, which may utilize ASP 164 and/or 174 to provide use case functionalities to other services or applications. A service on one device may communicate with a service on one or more other devices using a common protocol defined in each service and the ASP. For example, service 168 may utilize ASP 164 and/or ASP 174 to provide printing functionalities to at least one service 178, e.g., implemented by at least one application.

In some demonstrative embodiments, device 140 may include at least one service 178, e.g., a browser and/or any other application, configured to use a remote service, e.g., service 168.

In some demonstrative embodiments, service 178 may include a software process having a user interface, which a user may employ to accomplish a task, e.g., web browsing, instant messaging, sending a file and/or streaming media. For example, a user of service 178 may utilize service 178 for the task of web browsing.

In some demonstrative embodiments, device 102 may advertise service 168 to enable another device, e.g., device 140, to discover service 168.

In some demonstrative embodiments, device 140 may receive the advertisement of service 168.

In some demonstrative embodiments, ASP 164 may communicate with ASP 174 via a P2P connection over WM 103 to manage an ASP session between ASP 164 and ASP 174.

In some demonstrative embodiments, ASP 164 and ASP 174 may manage the ASP session, for example, to enable and/or to manage usage of service 168 by device 140, for example, to enable the browser application to print content of a webpage.

Some procedures, for example, according to a Wi-Fi P2P (Wi-Fi Direct) Service Specification, may not be efficient and/or may have one or more disadvantages, for example, in some scenarios, implementations and/or use cases.

For example, a user experience may be degraded, for example, if a P2P device is required to wait for a predefined period, e.g., 2 minutes, to start a new discovery procedure, for example, when the P2P device is in a connection session setup procedure with a peer P2P device, and the peer P2P device becomes un available, suspends the connection session, encounters a wrong state, or is out of range, e.g., as described below.

Figure 2:
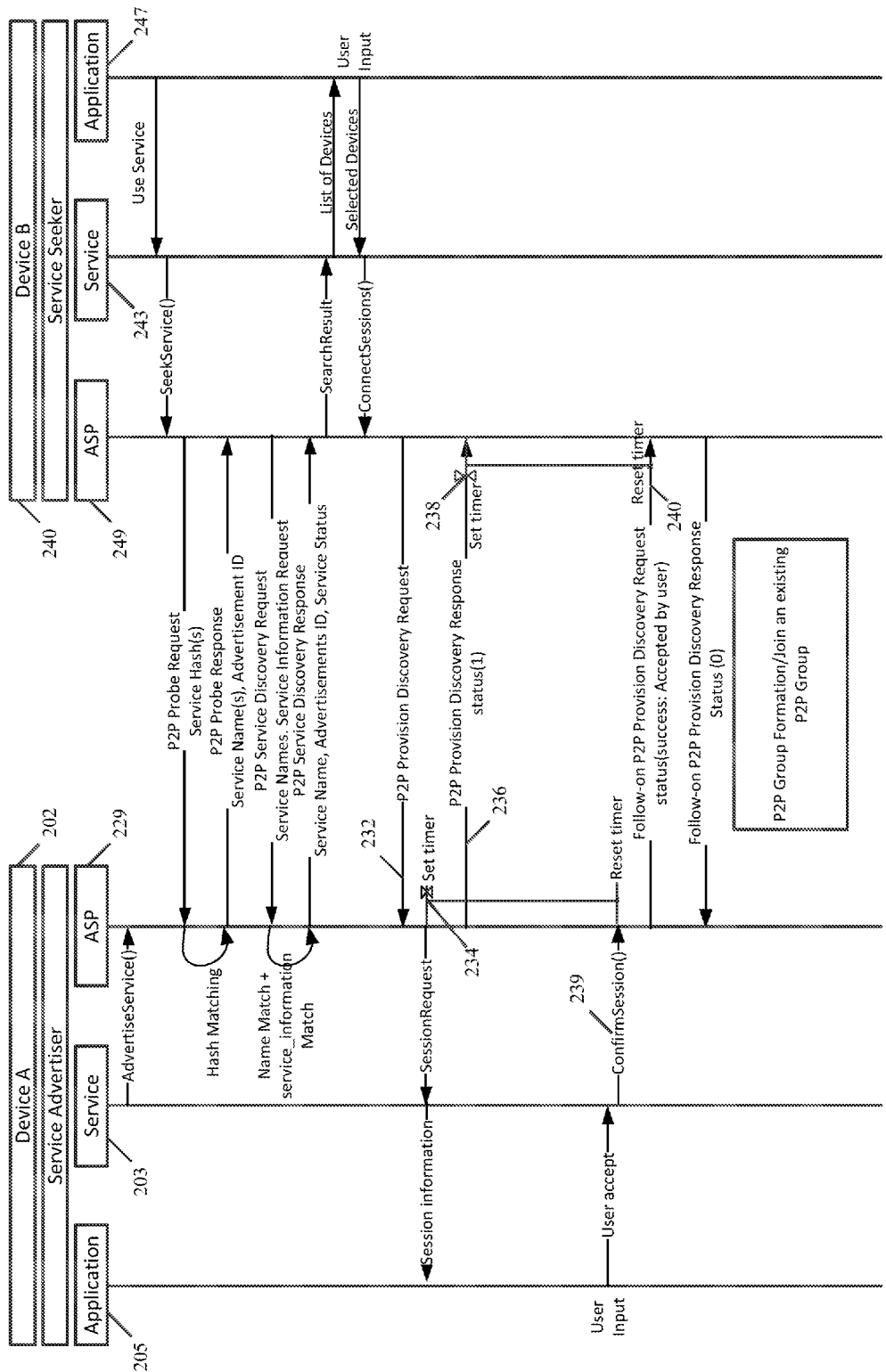
FIG. 2 is a schematic illustration of communications and operations of a peer-to-peer connection session setup procedure, which may be implemented in accordance with some demonstrative embodiments.

FIG. 2 is a schematic illustration of communications and operations of a peer-to-peer session connection setup procedure between a first device 202, denoted Device A, and a station device 240, denoted Device B, which may be implemented in accordance with some demonstrative embodiments, for example, in compliance with a WiFi Direct Services Technical Specification.

In some demonstrative embodiments, as shown in FIG. 2, the device 202 may operate as a service advertiser to advertise a service 203 to be provided by an application 205 executed by device 202.

In some demonstrative embodiments, as shown in FIG. 2, the device 240 may operate as a service seeker to seek a service 203 to be provided to a service 243 of an application 247 executed by device 240.

In some demonstrative embodiments, devices 202 and 240 may be configured to perform one or more operations of a connection session setup procedure, e.g., to setup a P2P connection for an ASP session between devices 202 and 240.

In some demonstrative embodiments, as shown in FIG. 2, an ASP 249 of device 240 may send to an ASP 229 of device 202 a P2P provision discovery request 232.

In some demonstrative embodiments, as shown in FIG. 2, ASP 229 may set a timer ("waiting timer") 234, for example, upon forwarding a session request to service 203, e.g., based on the P2P provision discovery request 232.

In some demonstrative embodiments, as shown in FIG. 2, ASP 229 may send a P2P provision discovery response 236 to ASP 249, for example, in response to the P2P provision discovery request 232.

In some demonstrative embodiments, as shown in FIG. 2, ASP 249 may set a waiting timer 236, for example, based on receipt of the P2P provision discovery response 238.

In some demonstrative embodiments, the waiting timer 234 and/or the waiting timer 238 may be set for a predefined waiting period, for example, 120 seconds, or any other waiting period.

In some demonstrative embodiments, ASP 229 may be allowed to reset the waiting timer, for example, upon receipt of a message ("ConfirmSession") from service 203, e.g., to confirm the request to setup the session.

In some demonstrative embodiments, it may be inefficient and/or disadvantageous to require device 240 to remain in a waiting state after setting waiting timer 236, for example, until the timer expires or until a follow up P2P provision discovery request 240 is received from ASP 229.

In some demonstrative embodiments, it may be inefficient and/or disadvantageous to only allow device 240 to reset the waiting timer 236, for example, only upon receipt of the follow up P2P provision discovery request 240 is received from ASP 229.

For example, in some cases it may be inefficient and/or disadvantageous to require device 240 to remain in the waiting state until the waiting timer expires, for example, for the entire waiting period, e.g., 2 minutes, before allowing the device 240 start a new discovery process and/or free up a resource. For example, it may be inefficient and/or disadvantageous to require device 240 to remain in the waiting state until the waiting timer expires, for example, even in a case where Device A is walking away, suspends the connection session setup, or encounters a system error.

In some demonstrative embodiments, it may be inefficient and/or disadvantageous, e.g., at least in terms of user experience and/or power consumption, to have a P2P Device, e.g., device 240, wait for expiration of the waiting timer, e.g., to wait for the entire period of 2 minutes, before being allowed to get out of the waiting state, for example, in a case where the peer device, e.g., device 202 suspends or stops the connection session setup. The waiting time, e.g., 2 minutes, may be too long, and may, for example, cause bad user experience and/or one or more other inefficiencies and/or disadvantages.

Referring back to FIG. 1, in some demonstrative embodiments, devices 102 and/or 140 may be configured to utilize a signaling mechanism, which may be configured to allow a P2P device, e.g., device 140, which is in a "waiting" state with respect to a peer P2P device (also referred to as "remote P2P device"), e.g., device 102, to check a state of the remote P2P device, for example, to check whether the remote P2P device is still in range and still in a valid state of processing a connection request and response transaction, e.g., of the session connection setup procedure.

In some demonstrative embodiments, the P2P device, e.g., device 140, may be configured to check and/or determine a status of a remote P2P device, e.g., device 102, for example, to determine whether or not to continue waiting in a waiting state, for example, to determine to avoid "sticking" in the waiting state, e.g., as described below.

In some demonstrative embodiments, enabling the P2P device, e.g., device 140, to determine the sate of the remote P2P device, e.g., device 102, for example, when the P2P device is at the "waiting" state, may enable the P2P device to get out of the "waiting" state, for example, quickly, e.g., before expiration of the "waiting" timer, for example, if the remote P2P device is not any more in the connection request/response transaction.

In some demonstrative embodiments, devices 102 and/or 140 may be configured to use one or more messages, which may be configured to enable to check and/or confirm whether the remote P2P device is in the valid state, e.g., as described below.

In some demonstrative embodiments, devices 102 and/or 140 may be configured to use a Probe Request and/or a Probe Response, which may be configured to enable to check and/or confirm whether the remote P2P device is in the valid state, e.g., as described below.

In some demonstrative embodiments, devices 102 and/or 140 may be configured to communicate the Probe Request and/or the Probe Response, for example, during the connection session setup procedure, e.g., as described below.

In some demonstrative embodiments, the Probe Request frame may be configured to include an attribute, which may be, for example, included in a P2P Information Element (IE), e.g., as described below.

In some demonstrative embodiments, devices 102 and/or 140 may be configured to generate, process and/or communicate a probe request frame and/or a probe response frame including information to identify a session for which the status of the remote P2P device is to be checked and/or confirmed, e.g., as described below.

In some demonstrative embodiments, devices 102 and/or 140 may be configured to generate, process and/or communicate a probe request frame and/or a probe response frame including a Session Identifier (ID) information (Info) attribute ("Session ID Info attribute"), e.g., as described below.

In some demonstrative embodiments, a P2P device, e.g., device 140, which is in a "waiting" state with respect to a peer P2P device, e.g., device 102, may be configured to generate and transmit to the remote P2P device, e.g., device 102, a Probe Request frame with a P2P IE including the Session ID Info attribute, for example, to identify a session that the P2P device, e.g., device 140, would like to confirm, e.g., as described below.

In some demonstrative embodiments, the remote P2P device, e.g., device 102, may be configured to, upon receipt of the Probe Request frame with the Session ID Info attribute, transmit a Probe Response frame with the Session ID Info attribute, for example, if the remote P2P device is still performing the connection session setup transaction, e.g., if the state of the connection session procedure is valid. Otherwise, the remote P2P device, e.g., device 102, may select not to transmit a Probe Response, or may select to transmit a Probe Response without the Session ID Info attribute, for example, if the remote P2P device is not performing the connection session setup transaction.

In some demonstrative embodiments, enabling the P2P device, e.g., device 140, to request the remote P2P device, e.g., device 102, to indicate a connection session status of the remote P2P device, and/or enabling the remote P2P device to signal the connection session status of the remote P2P device, may allow the P2P device, which is "waiting" for the remote P2P device, to detect whether the remote P2P device is in the valid state or not.

In some demonstrative embodiments, the P2P device, e.g., device 140, may be allowed to quickly get out of the "waiting" state, for example, even before expiration of the timer, e.g., even without needing to wait for the waiting period, e.g., two minutes, and be allowed to start a new discovery, for example, if the remote P2P device, e.g., device 102, encounters a system error or moves away.

In some demonstrative embodiments, enabling the P2P device, e.g., device 140, to request the remote P2P device, e.g., device 102, to indicate a connection session status of the remote P2P device, and/or enabling the remote P2P device to signal the connection session status of the remote P2P device, may allow, for example, at least to improve user experience, an/or may provide a more power efficient discovery for P2P devices.

In some demonstrative embodiments, the Session ID info attribute may include one or more fields, which may be configured to identify a session, e.g., as follows:

TABLE 1

| Field | Size (octets) | Value | Description |
| --- | --- | --- | --- |
| Attribute ID | 1 | 26 | Identifying the type of P2P attribute. The specific value is defined in Table 6 of a Wi-Fi P2P Technical Specification (P2P Attribute ID definitions) |
| Length | 2 | 10 | Length of the following field in the attribute. |
| Session ID | 4 | 0x00000000-0xFFFFFFFF | Value of the session_id |
| Session MAC Address | 6 | Variable | P2P device address of the P2P device which assigned the session_id |

In some demonstrative embodiments, the Session ID Info attribute may uniquely identify a session, e.g., an ASP session (ASP-Session). The Session ID Info attribute may be used, for example, in Provision Discovery Request frames to request ASP-Session establishment to a specific Wi-Fi Direct service on a peer device.

In some demonstrative embodiments, a device, for example, a P2P device, e.g., device 102 and/or device 140, may be configured to include the Session ID Info attribute in a Provision Discovery Request frame and/or in a Provision Discovery Response frame, e.g., in accordance with a Wi-Fi P2P Technical Specification, and/or any other Specification or Protocol.

In some demonstrative embodiments, a device, for example, a P2P device, e.g., device 102 and/or device 140, may be configured to include the Session ID Info attribute in a Probe Request frame, and/or a Probe Response frame, e.g., as described below.

In some demonstrative embodiments, a device, for example, a P2P device, e.g., device 102 and/or device 140, may be configured to generate, transmit, receive, access, and/or process a probe request frame and/or a probe response frame including the Session ID Info attribute, e.g., as described below.

In some demonstrative embodiments, devices 102 and/or 140 may be configured to include the Session ID Info attribute in a Probe Request frame, and/or a Probe Response frame, for example, if the session is matched.

In some demonstrative embodiments, two devices, e.g., devices 102 and/or 140, may be configured to include the Session ID Info attribute in the Probe Request and/or Probe Response frames, for example, to check whether the two devices are still in the process of the connection session setup, e.g., as described below.

In some demonstrative embodiments, the Session ID Info attribute may uniquely identify a session, e.g., an ASP-Session.

In some demonstrative embodiments, the Session ID Info attribute may be used in the Provision Discovery Request frames to request ASP-Session establishment to a specific Wi-Fi Direct service on a peer device.

In some demonstrative embodiments, a P2P device, e.g., device 102, may be allowed to respond to a Probe Request frame, for example, when the P2P device is in the connection setup for an ASP session with a remote ASP2 Device, e.g., device 140, that transmits the Probe Request frame, e.g., as described below.

In some demonstrative embodiments, the Session ID Info attribute of Table 1 may include a Session ID value, and a Session MAC address, which may uniquely identify a session. For example, a combination of the Session ID and the MAC address may uniquely identify the session, e.g., as described above.

In some demonstrative embodiments, the Session ID may be assigned, for example, by a Seeker device, e.g., which first transmits a Provision Discovery Request frame, e.g., including the Session ID Info attribute with the Session ID, e.g., as described above.

In some demonstrative embodiments, the Session MAC Address may include a MAC address of a P2P Device, e.g., in this case the Seeker device, which assigned the value of the Session-id, e.g., as described above.

In some demonstrative embodiments, for example, if two devices, e.g., devices 102 and 140, are in a connection session setup, both devices should have the same contents of Session ID Info. For example, the Session ID and Session MAC address for both devices may be identical (match).

In some demonstrative embodiments, a Probe Request frame format may be configured to include the Session ID Info attribute, e.g., of Table 1, for example, as a P2P attribute, e.g., as follows:

TABLE 2

| Attributes | Attribute ID | Note |
|---|---|---|
| Session ID Info | 26 | The Session ID Info attribute may be present in the P2P IE if ASP2-P2P is supported. The usage of this attribute is defined in the ASP2 technical Specification [x]. |

In some demonstrative embodiments, a Probe Response frame format may be configured to include the Session ID Info attribute, e.g., of Table 1, for example, as a P2P attribute, e.g., as follows:

TABLE 3

| Attributes | Attribute ID | Note |
|---|---|---|
| Session ID Info | 26 | The Session ID Info attribute may be present in the P2P IE if ASP2-P2P is supported. The usage of this attribute is defined in the ASP2 technical Specification [x] |

In some demonstrative embodiments, when a device, for example, an ASP2 Device, e.g., either Service Advertiser or Service Seeker, for example, device 140, is in the waiting of a timer, e.g., a 120 second timer, the ASP2 Device may transmit a unicast Probe Request frame including the Session ID Info attribute to a remote ASP2 Device, e.g., device 102, for example, to check whether the remote ASP2 Device is still in the same connection session setup process.

In some demonstrative embodiments, a P2P device, e.g., device 102, shall be allowed to respond to a Probe Request frame, for example, in the connection setup for an ASP session with a remote ASP2 Device, e.g., device 140, that transmits the Probe Request frame.

In some demonstrative embodiments, upon receipt of the Probe Request frame with the Session ID Info attribute, the remote ASP2 Device, e.g., device 102, shall respond with a Probe Response frame including the Session ID Info attribute, e.g., if the remote ASP2 Device is in the same connection session setup.

In some demonstrative embodiments, for example, if the remote ASP2 Device is not in the same connection setup, the remote ASP2 Device shall transmit the Probe Response frame without the Session ID Info attribute.

In some demonstrative embodiments, if a device, for example, the ASP2 Device, e.g., device 140, that successfully transmitted the Probe Request frame including the Session ID Info attribute, receives the Probe Response frame without matched Session ID Info, the device may consider the connection session setup failed and may stop the waiting timer, e.g., the 120 second timer.

In some demonstrative embodiments, if the device, for example, the ASP2 Device, e.g., device 140, that successfully transmitted the Probe Request frame including the Session ID Info attribute, does not receive any Probe Response frame, the Device may consider the connection session setup failed and may stop the 120 second timer.

In some demonstrative embodiments, before concluding the connection session setup failed, the device, for example, the ASP2 device, that successfully transmitted the Probe Request frame, e.g., device 140, should consider retransmitting the Probe Request frame and repeat the procedure, for example, in case the remote device, e.g., device 102, may be temporarily unavailable.

In some demonstrative embodiments, an interval of the Probe Request frames that the ASP2 Device transmits should not be less than a predefined period, e.g., one second.

In some demonstrative embodiments, the 120 second timer may be due, for example, to either auto_accept set to FALSE or waiting for PIN input, or any other reason.

In some demonstrative embodiments, controller 154 may be configured to control, cause and/or trigger a peer-to-peer device implemented by device 140 to generate a probe request including a session ID Info attribute, e.g., including one or more of the fields of Table 1.

In some demonstrative embodiments, controller 154 may be configured to control, cause and/or trigger the peer-to-peer device implemented by device 140 to transmit the probe request to a second peer-to-peer device, e.g., device 102, for example, during a connection session setup of a session with the second peer-to-peer device.

In some demonstrative embodiments, the probe request may include a unicast frame individually addressed to the second peer-to-peer device.

In some demonstrative embodiments, the session may include an ASP session, e.g., an ASP2 session, between ASP 174 and ASP 164, e.g., as described above.

In some demonstrative embodiments, controller 124 may be configured to control, cause and/or trigger the peer-to-peer device implemented by device 102 to process the probe request received from device 140 during the connection session setup of the session, and to transmit to device 140 a probe response in response to the probe request.

In some demonstrative embodiments, the probe response may include the session ID Info attribute, e.g., including one or more of the fields of Table 1.

In some demonstrative embodiments, the Session ID Info attribute may include a Session ID field including a value of a session ID, and a session MAC address field including a peer-to-peer device address, e.g., as described above.

In some demonstrative embodiments, a combination of the session ID and the peer-to-peer device address may uniquely identify the session, e.g., as described above.

In some demonstrative embodiments, the session MAC address field may include, for example, a peer-to-peer device address of a peer-to-peer device, by which the session ID is assigned, for example, the MAC address of the service seeker, e.g., as described above.

In some demonstrative embodiments, controller 154 may be configured to control, cause and/or trigger the peer-to-peer device implemented by device 140 to set a waiting timer to count a waiting period during a connection session setup of a session with a second peer-to-peer device, e.g., the peer-to-peer device implemented by device 102.

In some demonstrative embodiments, the session may include an ASP session, e.g., an ASP2 session, between ASP 174 and ASP 164, e.g., as described above.

In some demonstrative embodiments, the waiting timer may include a 120 second timer, e.g., as described above, or any other timer.

In some demonstrative embodiments, controller 154 may be configured to control, cause and/or trigger the peer-to-peer device implemented by device 140 to check whether the second peer-to-peer device is in the connection session setup during the waiting period, for example, by transmitting to the second peer-to-peer device a probe request including an Info attribute.

In some demonstrative embodiments, the probe request may include a unicast frame individually addressed to the second peer-to-peer device, e.g., as described above.

In some demonstrative embodiments, the Info attribute may include a Session Identifier (ID) Info attribute, e.g., as described above.

In some demonstrative embodiments, the Session ID Info attribute may include a Session ID field including a value of a session ID, and a session MAC address field including a peer-to-peer device address, e.g., as described above.

In some demonstrative embodiments, a combination of the session ID and the peer-to-peer device address may uniquely identify the session, e.g., as described above.

In some demonstrative embodiments, the session MAC address field may include a peer-to-peer device address of a peer-to-peer device, by which the session ID is assigned, e.g., as described above.

In some demonstrative embodiments, controller 154 may be configured to control, cause and/or trigger the peer-to-peer device implemented by device 140 to determine a failure of the connection session setup and to stop the waiting timer during the waiting period, for example, if a probe response, which includes the Info attribute, e.g., the same Info attribute included in the probe request, is not received from the second peer-to-peer device, e.g., within a predefined time period from transmitting the probe request.

In some demonstrative embodiments, controller 154 may be configured to control, cause and/or trigger the peer-to-peer device implemented by device 140 to retransmit the probe request during the waiting period, for example, if a probe response, which includes the Info attribute, e.g., the same Info attribute included in the probe request, is not received from the second peer-to-peer device.

In some demonstrative embodiments, controller 154 may be configured to allow the peer-to-peer device implemented by device 140 to determine the failure of the connection session setup and stop the waiting timer during the waiting period, for example, if no probe response is received from the second peer-to-peer device.

In some demonstrative embodiments, controller 154 may be configured to allow the peer-to-peer device implemented by device 140 to determine the failure of the connection session setup and stop the waiting timer during the waiting period, for example, if a probe response, which does not include the Info attribute, e.g., a probe response which does not include the same Info attribute included in the probe request, is received from the second peer-to-peer device.

In some demonstrative embodiments, controller 124 may be configured to control, cause and/or trigger the peer-to-peer device implemented by device 102 to set a waiting timer to count a waiting period, e.g., the 120 second period, during the connection session setup of the session, e.g., the ASP session, with the peer-to-peer device implemented by device 140.

In some demonstrative embodiments, controller 124 may be configured to control, cause and/or trigger the peer-to-peer device implemented by device 102 to process the probe request including the Info attribute from device 140, for example, during the waiting period, e.g., as described above.

In some demonstrative embodiments, controller 124 may be configured to control, cause and/or trigger the peer-to-peer device implemented by device 102 to transmit to the peer-to-peer device implemented by device 140 a probe response, for example, upon receipt of the probe request including the Info attribute from device 102 during the waiting period.

In some demonstrative embodiments, controller 124 may be configured to control, cause and/or trigger the peer-to-peer device implemented by device 102 to transmit the probe response, which includes the Info attribute, e.g., the same Info attribute included in the probe request, for example, when the peer-to-peer device implemented by device 102 is still in the connection session setup.

In some demonstrative embodiments, controller 124 may be configured to control, cause and/or trigger the peer-to-peer device implemented by device 102 to transmit the probe response, which does not include the Info attribute, e.g., which does not include the same Info attribute included in the probe request, for example, when the peer-to-peer device implemented by device 102 is not in the connection session setup.

In some demonstrative embodiments, controller 124 may be configured to control, cause and/or trigger the peer-to-peer device implemented by device 102 to select not to transmit the probe response, e.g., in response to the probe request, for example, when the peer-to-peer device implemented by device 102 is not in the connection session setup.

Figure 3:
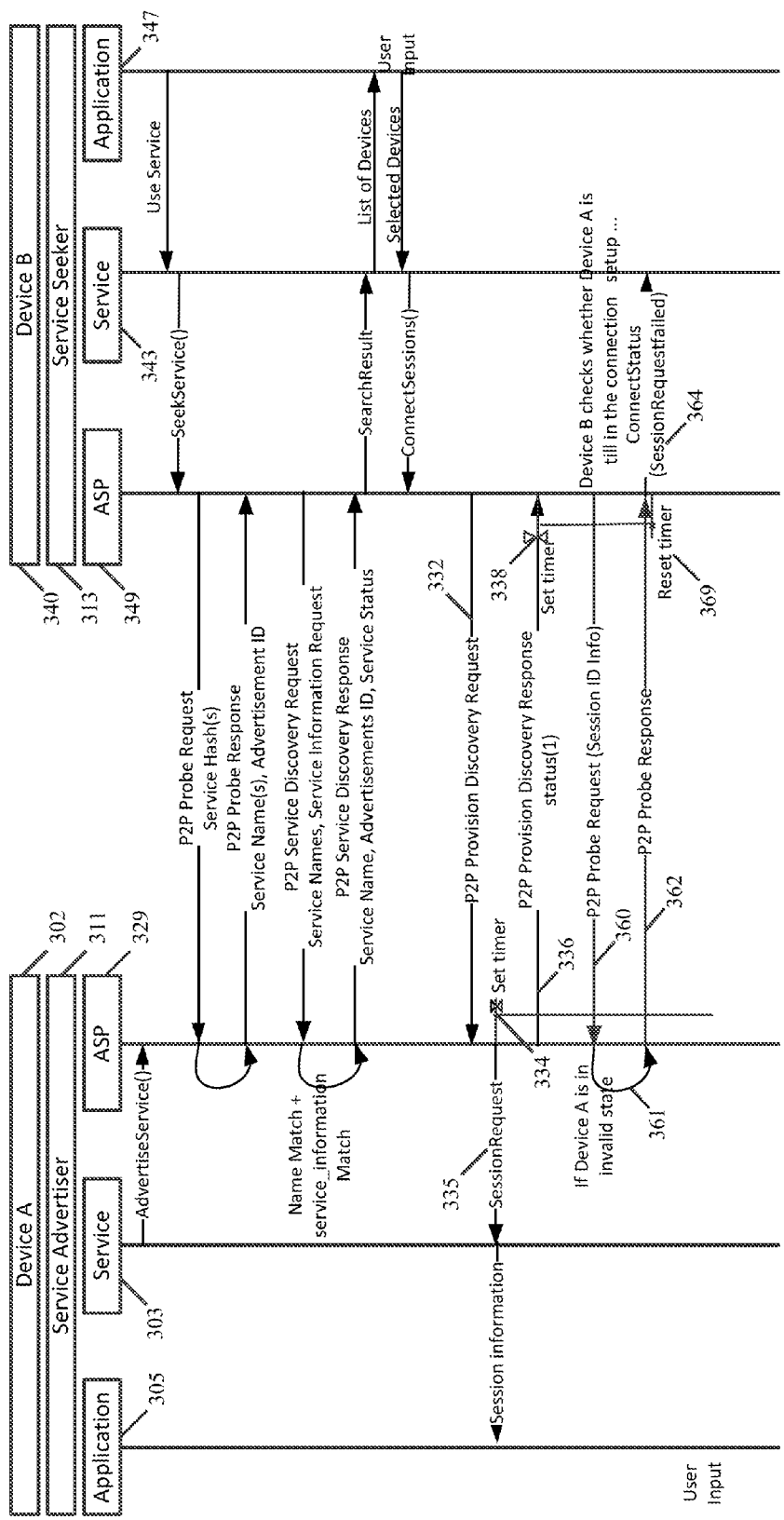
FIG. 3 is a schematic illustration of communications and operations of signaling a peer-to-peer connection state during connection session setup, in accordance with some demonstrative embodiments.
Figure 4:
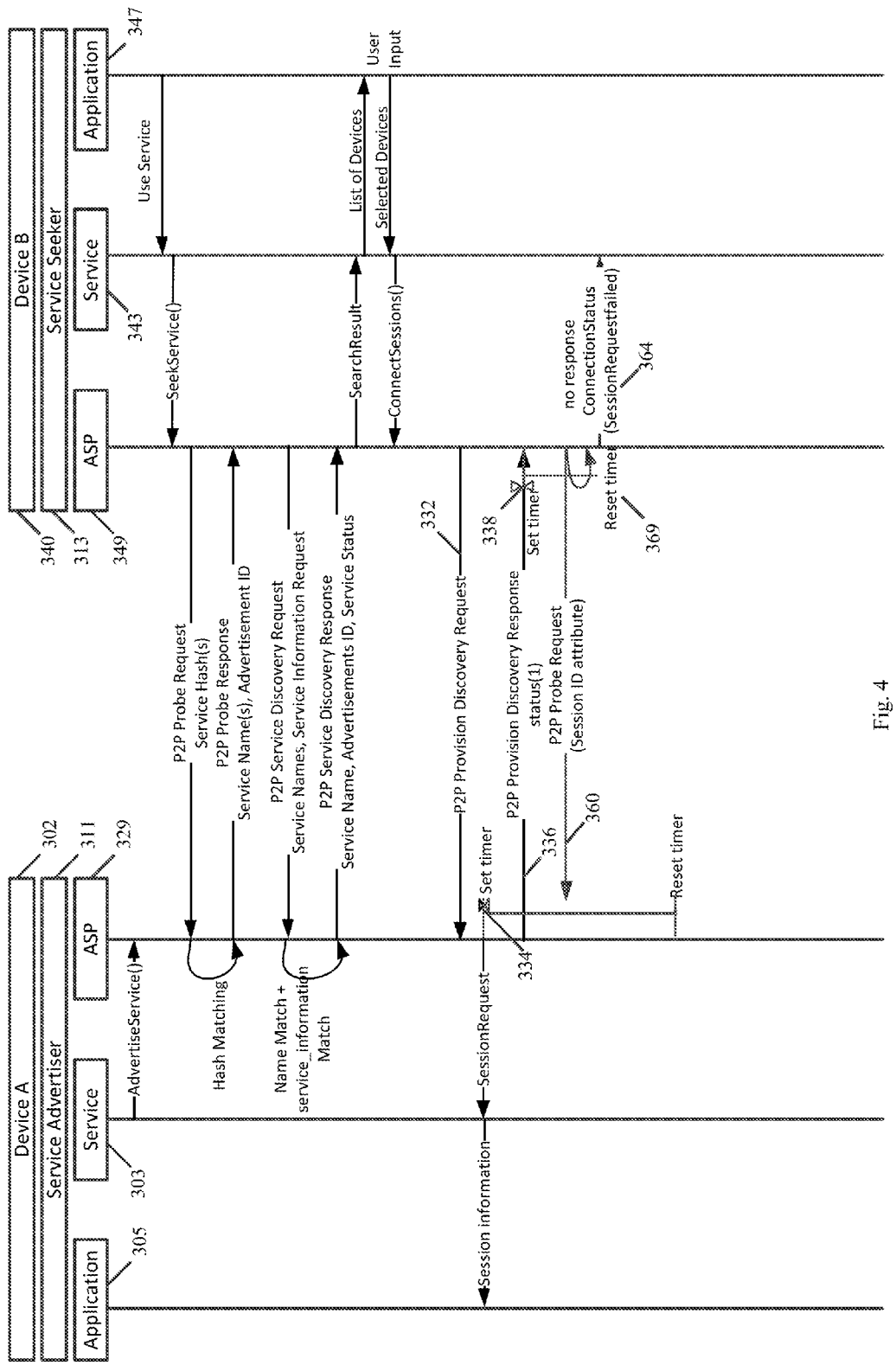
FIG. 4 is a schematic illustration of communications and operations of signaling a peer-to-peer connection state during connection session setup, in accordance with some demonstrative embodiments.

Reference is made to FIG. 3, which schematically illustrates communications and operations of signaling a peer-to-peer connection state during connection session setup, e.g., according to a first signaling scheme, and to FIG. 4, which schematically illustrates communications and operations of signaling a peer-to-peer connection state during connection session setup, e.g., according to a second signaling scheme, in accordance with some demonstrative embodiments.

In some demonstrative embodiments, as shown in FIGS. 3 and 4, a first device 302, denoted Device A, and a station device 340, denoted Device B, may be configured, for example, to perform one or more operations and/or communications to signal a peer-to-peer connection state, e.g., as described below. For example, device 102 (FIG. 1) may be configured to perform one or more operations and/or functionalities of device 302, and/or device 140 (FIG. 1) may be configured to perform one or more operations and/or functionalities of device 340.

In some demonstrative embodiments, devices 302 and/or 340 may be configured to perform one or more operations and/or communications of FIGS. 3 and/or 4, for example, in a provision discovery scenario, for example, of a deferred failure detected by a remote device, e.g., as described below.

In some demonstrative embodiments, as shown in FIGS. 3 and 4, the device 302 may operate as a service advertiser to advertise a service 303 to be provided by an application 305 executed by device 302.

In some demonstrative embodiments, as shown in FIGS. 3 and 4, the device 340 may operate as a service seeker to seek a service 303 to be provided to a service 343 of an application 347 executed by device 340.

In some demonstrative embodiments, devices 302 and 340 may be configured to perform one or more operations of a connection session setup procedure, e.g., to setup a P2P connection for an ASP session between devices 302 and 340.

In some demonstrative embodiments, as shown in FIGS. 3 and 4, an ASP 349 of device 340 may send to an ASP 329 of device 302 a P2P provision discovery request 332. For example, ASP 164 (FIG. 1) may be configured to perform one or more operations and/or functionalities of ASP 329, and/or ASP 174 (FIG. 1) may be configured to perform one or more operations and/or functionalities of ASP 349.

In some demonstrative embodiments, P2P provision discovery request 332 may include, for example, a Session ID Info attribute may uniquely identify a session, e.g., an ASP session, to be established between ASP 329 and ASP 349, e.g., as described above.

In some demonstrative embodiments, the Session ID Info attribute may include, for example, a Session ID value, and a Session MAC address, e.g., as described above. For example, the Session ID Info attribute may include the fields of Table 1.

In some demonstrative embodiments, the Session ID may be assigned, for example, by Service Seeker 313, e.g., as described above.

In some demonstrative embodiments, the Session MAC Address may include a MAC address of device 340, which assigns the value of the Session-id, e.g., as described above.

In some demonstrative embodiments, as shown in FIGS. 3 and 4, ASP 329 may set a waiting timer 334, for example, upon forwarding a session request 335 to service 303, e.g., based on the P2P provision discovery request 332.

In some demonstrative embodiments, as shown in FIGS. 3 and 4, ASP 329 may send a P2P provision discovery response 336 to ASP 349, for example, in response to the P2P provision discovery request 332.

In some demonstrative embodiments, the P2P provision discovery response 336 may include, for example, the Session ID Info attribute, e.g., including the same fields of the Session ID Info attribute, which was included in the P2P provision discovery request 332.

In some demonstrative embodiments, as shown in FIGS. 3 and 4, ASP 349 may set a waiting timer 336, for example, based on receipt of the P2P provision discovery response 338, e.g., upon receiving P2P provision discovery response 338 including the same Session ID info attribute, which was included in the P2P provision discovery request 332.

In some demonstrative embodiments, ASP 329 may be configured to set the waiting timer 334 to a predefined waiting period, for example, 120 seconds, or any other waiting period; and/or ASP 349 may be configured to set the waiting timer 336 to a predefined waiting period, for example, 120 seconds, or any other waiting period.

In some demonstrative embodiments, as shown in FIGS. 3 and 4, devices 302 and/or 340 may be configured to perform one or more operations and/or communications, for example, when a service, e.g., service 303, sets auto accept to FALSE, and an ASP2 Device, e.g., device 340, detects failure on a remote ASP2 Device, e.g., device 302, for example, a system error or an out of range error, e.g., as described below. In other embodiments, one or more of the operations of FIGS. 3 and/or 4 may be implemented with respect to one or more additional or alternative scenarios, implementations, and/or use cases.

In some demonstrative embodiments, as shown in FIGS. 3 and 4, device 340 may be in a waiting state, for example, during the connection session setup procedure. For example, device 340 may operate at the waiting state to wait, for example, upon setting waiting timer 338, e.g., to wait to receive from ASP 329 a message of the connection session setup procedure.

In some demonstrative embodiments, as shown in FIGS. 3 and 4, device 340 may send a Probe Request 360, e.g., a unicast probe request individually addressed to device 302, for example, during the waiting period, e.g., before expiration of the waiting timer 338.

In some demonstrative embodiments, as shown in FIGS. 3 and 4, the probe request 360 may include a Session ID Info attribute.

In some demonstrative embodiments, the Session ID Info attribute may include the Session ID and Session MAC address, for example, to identify the connection session. For example, ASP 349 may send the probe request 360 including the same Session ID Info attribute, e.g., including the same Session ID and the same Session MAC address, which were included in the P2P provision discovery request 332.

In some demonstrative embodiments, as shown in FIGS. 3 and 4, device 302 may receive the probe request 360. For example, ASP 329 may process the probe request 360 from ASP 349.

In some demonstrative embodiments, as shown in FIG. 3, device 302 may send a Probe Response 463 to device 340, e.g., in response to the probe request 360.

In some demonstrative embodiments, as shown in FIG. 3, ASP 329 may send to ASP 349 the Probe Response 362 without including the Session ID Info attribute in the probe response 362, for example, if device 302 is not in the connection session transaction any more, e.g., not in the valid state 361.

In some demonstrative embodiments, as shown in FIG. 4, ASP 329 may select not to send a Probe Response to ASP 349, e.g., by selecting not to respond to probe request 360, for example, if device 302 is not in the connection session transaction any more, e.g., if device 302 is moving away, or if device 302 encounters some system error.

In some demonstrative embodiments, ASP 329 may send to ASP 349 a Probe Response with the Session ID Info attribute (not shown in FIG. 3 or 4), e.g., matched to the Session ID Info attribute in the Probe Request 360, for example, if device 302 is in the process of the connection request/response transaction, for example, if device 302 is at a valid state of the session connection procedure, e.g., as described above.

In some demonstrative embodiments, upon receipt of the Probe Response with the Session ID Info attribute (not shown in FIG. 3 or 4), e.g., matched to the Session ID Info attribute in the Probe Request 360, ASP 349 may continue to operate in the waiting state, e.g., while continuing to count the waiting timer 336.

In some demonstrative embodiments, as shown in FIGS. 3 and 4, ASP 349 should come out of the waiting time, for example, if device 340 receives no Probe Response frame (FIG. 4) or receives the Probe Response frame 362 without the matched Session ID Info attribute (FIG. 3).

In some demonstrative embodiments, as shown in FIGS. 3 and 4, ASP 349 should come out of the waiting time, for example, by resetting the waiting timer (369), and passing up a "connection failure" event 364, e.g., to service 343, to indicate a failure of setting up the ASP session.

In some demonstrative embodiments, enabling device 302 to signal to device 340 whether or not device 302 is still performing the session connection setup procedure, e.g., using the probe request/response messages, may enable device 340 reset the waiting timer (369) and provide the failure status 364, for example, even before expiration of the waiting timer.

In some demonstrative embodiments, a service seeker, e.g., device 340, may be configured to transmit a probe request during the waiting period of the connection session setup, and a service advertiser, e.g., device 302, may be configured to selectively transmit a probe response in response to the probe request, for example, to signal a status of the service advertiser, e.g., as described above.

In some demonstrative embodiments, the service advertiser, e.g., device 302, may transmit a probe request during the waiting period of the connection session setup, and the service seeker, e.g., device 340, may selectively transmit a probe response in response to the probe request, for example, to signal a status of the service seeker, e.g., as described below.

In some demonstrative embodiments, device 302 may be configured to transmit a probe request including the Session ID Info attribute, e.g., the same Session ID Info attribute included in the P2P Provision Discovery Request 332; and/or device 340 may be configured to selectively transmit a probe response including the Session ID Info attribute, e.g., in response to the probe request.

In some demonstrative embodiments, ASP 329 may be configured to allow device 302 to exit the waiting state earlier, for example, in the case of system error of device 340, e.g., based on a probe request with a Session ID Info attribute sent from device 302.

For example, ASP 329 may identify one or more failures, e.g., if:
device 302 sends a Probe Request with a Session ID Info attribute and gets no answer from device 340;
device 302 sends a Probe Request with a Session ID Info attribute and gets a response without a matching Session ID Info attribute; and/or
device 302 receives Probe Response without a Session ID Info attribute from device 340.

In some demonstrative embodiments, ASP 349 may be configured to identify an error of device 302, for example, if device 340 receives a Probe Request without a Session ID Info attribute from device 302.

In some demonstrative embodiments, a probe request and/or a probe response may be configured to include a Session ID Info attribute, for example, to identify a session of a connection session procedure, e.g., as described above.

In some demonstrative embodiments, the probe request and/or probe response may include any other information element, attribute, and/or field, which may be configured to identify a session of a connection session procedure, e.g., as described below.

In some demonstrative embodiments, the Probe Request frame and/or the probe response frame may be configured to include an attribute (the "Connection Session Status (CSS) attribute"), which may be, for example, included in a P2P Information Element (IE). For example, device 340 may send a Probe Request with a CSS attribute to device 302, for example, during a waiting period, e.g., before expiration of a waiting timer; and device 302 may receive the probe request, and may send to device 340 a Probe Response with the CSS attribute, for example, if the device 302 is in the process of the connection request/response transaction.

In some demonstrative embodiments, the CSS attribute may be included in a P2P IE, for example, in the form of a peer MAC address field, e.g., follows:

TABLE 4

| Field | Size (octets) | Value | Description |
| --- | --- | --- | --- |
| Attribute ID | 1 | 0x02 | Identifies the type of P2P attribute. |
| Length | 2 | Variable | Length of the following fields in the attribute. |
| Peer MAC address | 6 | Variable | Indicating the MAC address of the remote P2P device address that is engaged in the connection session. |

For example, a field of the Connection Session Status attribute, e.g., in a peer MAC address field of Table 4, may be set to include a remote P2P device MAC address which is in the middle of a connection session setup transaction.

Figure 5:
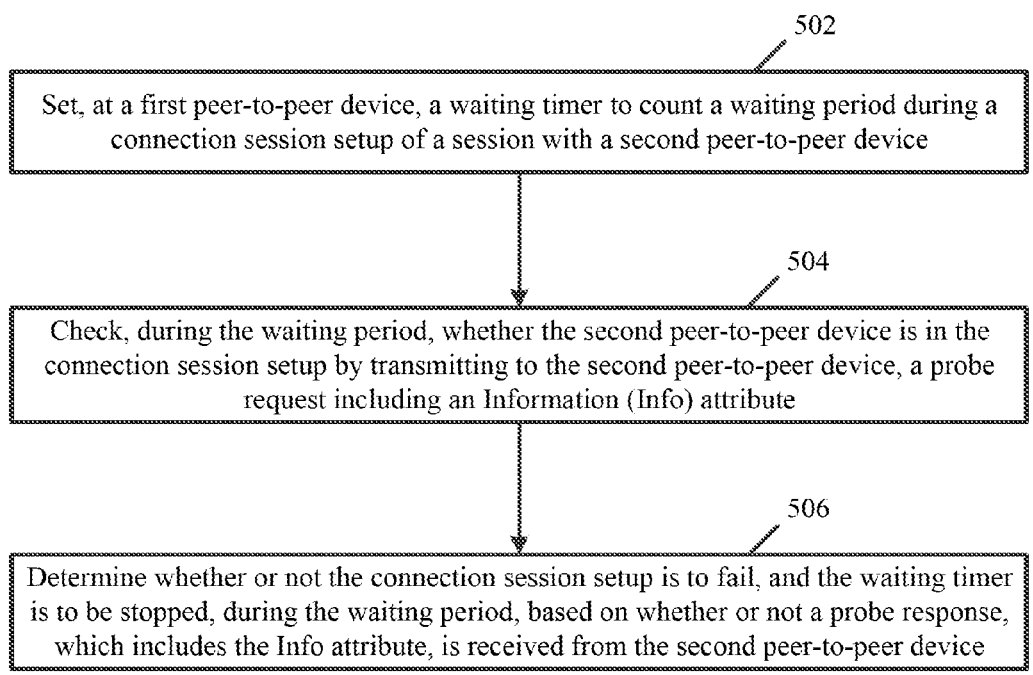
FIG. 5 is a schematic flow-chart illustration of a method of signaling a peer-to-peer connection state during connection session setup, in accordance with some demonstrative embodiments.

Reference is made to FIG. 5, which schematically illustrates a method of signaling a peer-to-peer connection state during connection session setup, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), device 140 (FIG. 1), device 302 (FIG. 3), and/or Device 304 (FIG. 4); a controller, e.g., controller 124 (FIG. 1) and/or controller 154 (FIG. 1); an ASP, e.g., ASP 164 (FIG. 1), ASP 174 (FIG. 1), Asp 329 (FIG. 3), and/or ASP 349 (FIG. 3); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); and/or a message processor, e.g., message processor 128 (FIG. 1) and/or message processor 158 (FIG. 1).

As indicated at block 502, the method may include setting, at a first peer-to-peer device, a waiting timer to count a waiting period during a connection session setup of a session with a second peer-to-peer device. For example, controller 154 (FIG. 1) may be configured to cause device 140 (FIG. 1) to set a waiting timer to count a waiting period during a connection session setup of a session between ASP 174 (FIG. 1) and ASP 164 (FIG. 1), e.g., as described above.

As indicated at block 504, the method may include checking, during the waiting period, whether the second peer-to-peer device is in the connection session setup by transmitting to the second peer-to-peer device, a probe request including an Information (Info) attribute. For example, controller 154 (FIG. 1) may be configured to cause device 140 (FIG. 1) to transmit to device 102 (FIG. 1) a probe request including the Session Info attribute during the waiting period, e.g., as described above.

As indicated at block 506, the method may include determining whether or not the connection session setup is to fail, and the waiting timer is to be stopped, during the waiting period, based on whether or not a probe response, which includes the Info attribute, is received from the second peer-to-peer device. For example, controller 154 (FIG. 1) may be configured to cause device 140 (FIG. 1) to determine whether or not the connection session setup is to fail, and the waiting timer is to be stopped, during the waiting period, based on whether or not a probe response, which includes the Info attribute, is received from device 102 (FIG. 1), e.g., as described above.

Figure 6:
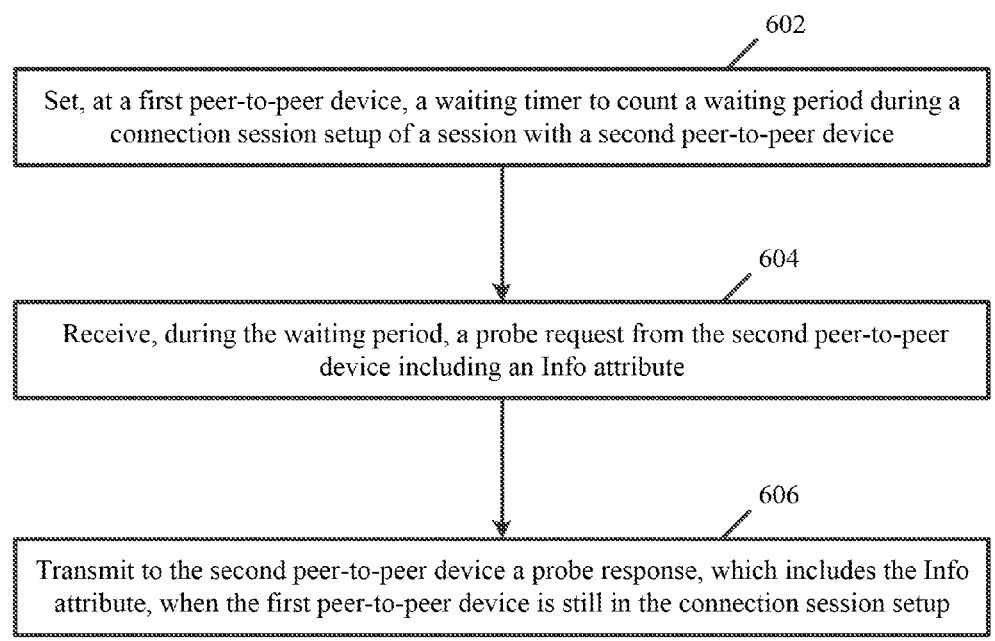
FIG. 6 is a schematic flow-chart illustration of a method of signaling a peer-to-peer connection state during connection session setup, in accordance with some demonstrative embodiments.

Reference is made to FIG. 6, which schematically illustrates a method of signaling a peer-to-peer connection state during connection session setup, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), device 140 (FIG. 1), device 302 (FIG. 3), and/or Device 304 (FIG. 4); a controller, e.g., controller 124 (FIG. 1) and/or controller 154 (FIG. 1); an ASP, e.g., ASP 164 (FIG. 1), ASP 174 (FIG. 1), Asp 329 (FIG. 3), and/or ASP 349 (FIG. 3); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); and/or a message processor, e.g., message processor 128 (FIG. 1) and/or message processor 158 (FIG. 1).

As indicated at block 602, the method may include setting, at a first peer-to-peer device, a waiting timer to count a waiting period during a connection session setup of a session with a second peer-to-peer device. For example, controller 124 (FIG. 1) may be configured to cause device 102 (FIG. 1) to set a waiting timer to count a waiting period during a connection session setup of a session between ASP 174 (FIG. 1) and ASP 164 (FIG. 1), e.g., as described above.

As indicated at block 604, the method may include receiving, during the waiting period, a probe request from the second peer-to-peer device including an Info attribute. For example, controller 124 (FIG. 1) may be configured to cause device 102 (FIG. 1) to process a probe request including the Info attribute from device 140 (FIG. 1) during the waiting period, e.g., as described above.

As indicated at block 606, the method may include transmitting to the second peer-to-peer device a probe response, which includes the Info attribute, when the first peer-to-peer device is still in the connection session setup. For example, controller 124 (FIG. 1) may be configured to cause device 102 (FIG. 1) to transmit the probe response including the Info attribute to device 140 (FIG. 1), for example, when device 102 (FIG. 1) is still in the connection session setup, e.g., as described above.

Figure 7:
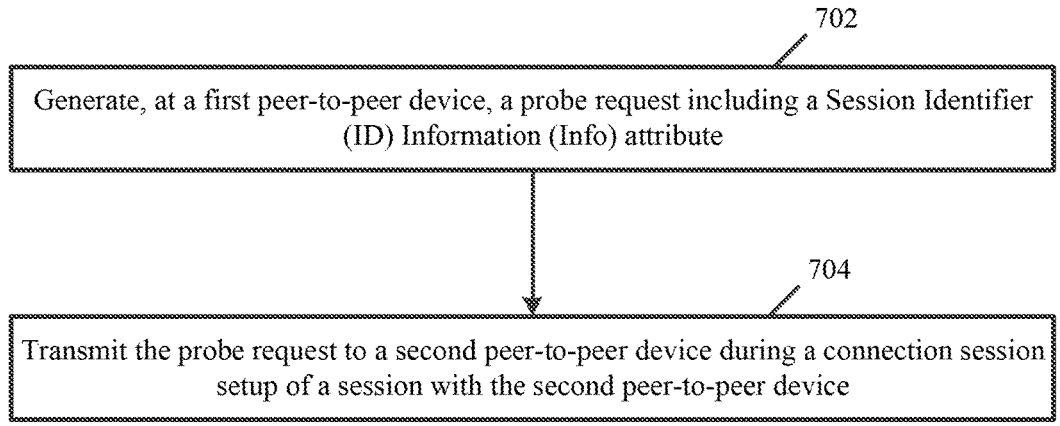
FIG. 7 is a schematic flow-chart illustration of a method of communicating a probe request, in accordance with some demonstrative embodiments.

Reference is made to FIG. 7, which schematically illustrates a method of communicating a probe request, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), device 140 (FIG. 1), device 302 (FIG. 3), and/or Device 304 (FIG. 4); a controller, e.g., controller 124 (FIG. 1) and/or controller 154 (FIG. 1); an ASP, e.g., ASP 164 (FIG. 1), ASP 174 (FIG. 1), Asp 329 (FIG. 3), and/or ASP 349 (FIG. 3); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); and/or a message processor, e.g., message processor 128 (FIG. 1) and/or message processor 158 (FIG. 1).

As indicated at block 702, the method may include generating, at a first peer-to-peer device, a probe request including a Session ID Info attribute. For example, For example, controller 154 (FIG. 1) may be configured to cause device 140 (FIG. 1) to generate a probe request including the Session Info attribute, e.g., as described above.

As indicated at block 704, the method may include transmitting the probe request to a second peer-to-peer device during a connection session setup of a session with the second peer-to-peer device. For example, controller 154 (FIG. 1) may be configured to cause device 140 (FIG. 1) to transmit the probe request to device 102 (FIG. 1) during the connection session setup, e.g., as described above.

Figure 8:
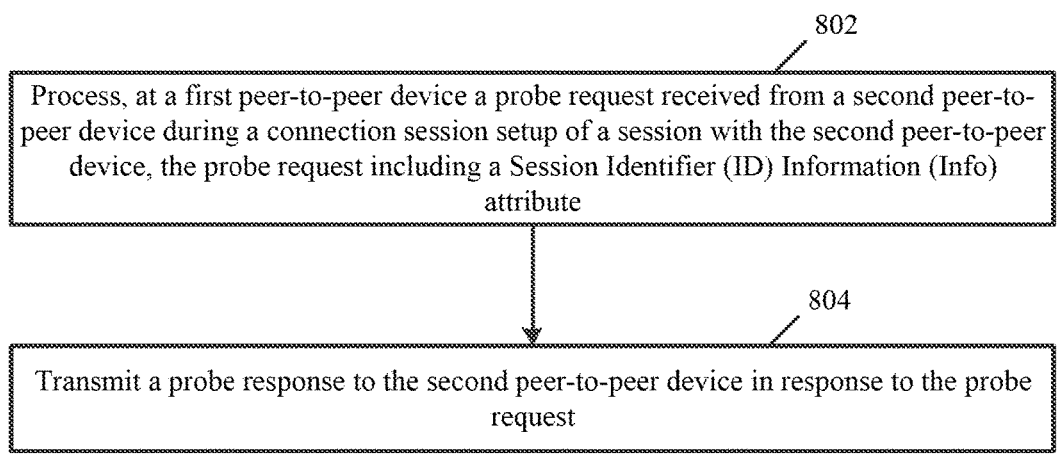
FIG. 8 is a schematic flow-chart illustration of a method of communicating a probe request and a probe response, in accordance with some demonstrative embodiments.

Reference is made to FIG. 8, which schematically illustrates a method of communicating a probe request and a probe response, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), device 140 (FIG. 1), device 302 (FIG. 3), and/or Device 304 (FIG. 4); a controller, e.g., controller 124 (FIG. 1) and/or controller 154 (FIG. 1); an ASP, e.g., ASP 164 (FIG. 1), ASP 174 (FIG. 1), Asp 329 (FIG. 3), and/or ASP 349 (FIG. 3); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); and/or a message processor, e.g., message processor 128 (FIG. 1) and/or message processor 158 (FIG. 1).

As indicated at block 802, the method may include processing, at a first peer-to-peer device, a probe request received from a second peer-to-peer device during a connection session setup of a session with the second peer-to-peer device, the probe request including a Session ID Info attribute. For example, controller 124 (FIG. 1) may be configured to cause device 102 (FIG. 1) to process a probe request including the Info attribute from device 140 (FIG. 1) during the connection session setup, e.g., as described above.

As indicated at block 804, the method may include transmitting a probe response to the second peer-to-peer device in response to the probe request. For example, controller 124 (FIG. 1) may be configured to cause device 102 (FIG. 1) to transmit the probe response to device 140 (FIG. 1), e.g., as described above.

Figure 9:
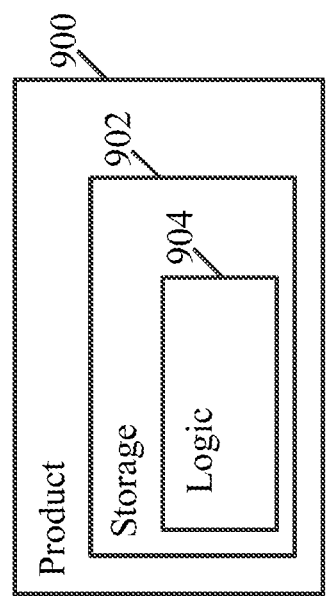
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable non-transitory storage media 902, which may include computer-executable instructions, e.g., implemented by logic 904, operable to, when executed by at least one computer processor, enable the at least one computer processor to implement one or more operations at device 102, device 140 (FIG. 1), device 302 (FIG. 3), device 340 (FIG. 3), transmitters 118 and/or 148 (FIG. 1), receivers 116 and/or 146 (FIG. 1), controllers 124 and/or 154 (FIG. 1), ASP 164 (FIG. 1), ASP 174 (FIG. 1), ASP 329 (FIG. 3), ASP 349 (FIG. 3), message processors 128 and/or 158 (FIG. 1), and/or to perform one or more operations described above with respect to FIGS. 1, 2, 3, 4, 5, 6, 7, and/or 8, and/or one or more operations described herein. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first peer-to-peer device to set a waiting timer to count a waiting period during a connection session setup of a session with a second peer-to-peer device; and during the waiting period, check whether the second peer-to-peer device is in the connection session setup by transmitting a probe request to the second peer-to-peer device, the probe request comprising an Information (Info) attribute.

Example 2 includes the subject matter of Example 1, and optionally, wherein the apparatus is configured to allow the first peer-to-peer device to determine a failure of the connection session setup and stop the waiting timer during the waiting period, if a probe response, which comprises the Info attribute, is not received from the second peer-to-peer device.

Example 3 includes the subject matter of Example 1 or 2, and optionally, wherein the apparatus is configured to cause the first peer-to-peer device to retransmit the probe request during the waiting period, if a probe response, which comprises the Info attribute, is not received from the second peer-to-peer device.

Example 4 includes the subject matter of any one of Examples 1-3, and optionally, wherein the apparatus is configured to allow the first peer-to-peer device to determine the failure of the connection session setup and stop the waiting timer during the waiting period, if no probe response is received from the second peer-to-peer device.

Example 5 includes the subject matter of any one of Examples 1-4, and optionally, wherein the apparatus is configured to allow the first peer-to-peer device to determine the failure of the connection session setup and stop the waiting timer during the waiting period, if a probe response, which does not include the Info attribute, is received from the second peer-to-peer device.

Example 6 includes the subject matter of any one of Examples 1-5, and optionally, wherein the Info attribute comprises a Session Identifier (ID) Info attribute.

Example 7 includes the subject matter of Example 6, and optionally, wherein the Session ID Info attribute comprises a Session ID field comprising a value of a session ID, and a session Media Access Control (MAC) address field comprising a peer-to-peer device address.

Example 8 includes the subject matter of Example 7, and optionally, wherein a combination of the session ID and the peer-to-peer device address is to uniquely identify the session.

Example 9 includes the subject matter of Example 7 or 8, and optionally, wherein the session MAC address field comprises a peer-to-peer device address of a peer-to-peer device, by which the session ID is assigned.

Example 10 includes the subject matter of any one of Examples 1-9, and optionally, wherein the session comprises an Application Service Platform (ASP) session between a first ASP of the first peer-to-peer device and a second ASP of the second peer-to-peer device.

Example 11 includes the subject matter of any one of Examples 1-10, and optionally, wherein the waiting timer comprises a 120 second timer.

Example 12 includes the subject matter of any one of Examples 1-11, and optionally, wherein the probe request comprises a unicast frame individually addressed to the second peer-to-peer device.

Example 13 includes the subject matter of any one of Examples 1-12, and optionally, comprising a radio.

Example 14 includes the subject matter of any one of Examples 1-13, and optionally, comprising one or more antennas, a memory and a processor.

Example 15 includes a system of wireless communication comprising a first peer-to-peer device, the first peer-to-peer device comprising one or more antennas; a radio; a memory; a processor; and a controller configured to cause the first peer-to-peer device to set a waiting timer to count a waiting period during a connection session setup of a session with a second peer-to-peer device; and during the waiting period, check whether the second peer-to-peer device is in the connection session setup by transmitting a probe request to the second peer-to-peer device, the probe request comprising an Information (Info) attribute.

Example 16 includes the subject matter of Example 15, and optionally, wherein the controller is configured to allow the first peer-to-peer device to determine a failure of the connection session setup and stop the waiting timer during the waiting period, if a probe response, which comprises the Info attribute, is not received from the second peer-to-peer device.

Example 17 includes the subject matter of Example 15 or 16, and optionally, wherein the controller is configured to cause the first peer-to-peer device to retransmit the probe request during the waiting period, if a probe response, which comprises the Info attribute, is not received from the second peer-to-peer device.

Example 18 includes the subject matter of any one of Examples 15-17, and optionally, wherein the controller is configured to allow the first peer-to-peer device to determine the failure of the connection session setup and stop the waiting timer during the waiting period, if no probe response is received from the second peer-to-peer device.

Example 19 includes the subject matter of any one of Examples 15-18, and optionally, wherein the controller is configured to allow the first peer-to-peer device to determine the failure of the connection session setup and stop the waiting timer during the waiting period, if a probe response, which does not include the Info attribute, is received from the second peer-to-peer device.

Example 20 includes the subject matter of any one of Examples 15-19, and optionally, wherein the Info attribute comprises a Session Identifier (ID) Info attribute.

Example 21 includes the subject matter of Example 20, and optionally, wherein the Session ID Info attribute comprises a Session ID field comprising a value of a session ID, and a session Media Access Control (MAC) address field comprising a peer-to-peer device address.

Example 22 includes the subject matter of Example 21, and optionally, wherein a combination of the session ID and the peer-to-peer device address is to uniquely identify the session.

Example 23 includes the subject matter of Example 21 or 22, and optionally, wherein the session MAC address field comprises a peer-to-peer device address of a peer-to-peer device, by which the session ID is assigned.

Example 24 includes the subject matter of any one of Examples 15-23, and optionally, wherein the session comprises an Application Service Platform (ASP) session between a first ASP of the first peer-to-peer device and a second ASP of the second peer-to-peer device.

Example 25 includes the subject matter of any one of Examples 15-24, and optionally, wherein the waiting timer comprises a 120 second timer.

Example 26 includes the subject matter of any one of Examples 15-25, and optionally, wherein the probe request comprises a unicast frame individually addressed to the second peer-to-peer device.

Example 27 includes a method to be performed at a first peer-to-peer device, the method comprising setting a waiting timer to count a waiting period during a connection session setup of a session with a second peer-to-peer device; and during the waiting period, checking whether the second peer-to-peer device is in the connection session setup by transmitting a probe request to the second peer-to-peer device, the probe request comprising an Information (Info) attribute.

Example 28 includes the subject matter of Example 27, and optionally, comprising determining a failure of the connection session setup and stopping the waiting timer during the waiting period, if a probe response, which comprises the Info attribute, is not received from the second peer-to-peer device.

Example 29 includes the subject matter of Example 27 or 28, and optionally, comprising retransmitting the probe request during the waiting period, if a probe response, which comprises the Info attribute, is not received from the second peer-to-peer device.

Example 30 includes the subject matter of any one of Examples 27-29, and optionally, comprising determining the failure of the connection session setup and stopping the waiting timer during the waiting period, if no probe response is received from the second peer-to-peer device.

Example 31 includes the subject matter of any one of Examples 27-30, and optionally, comprising determining the failure of the connection session setup and stopping the waiting timer during the waiting period, if a probe response, which does not include the Info attribute, is received from the second peer-to-peer device.

Example 32 includes the subject matter of any one of Examples 27-31, and optionally, wherein the Info attribute comprises a Session Identifier (ID) Info attribute.

Example 33 includes the subject matter of Example 32, and optionally, wherein the Session ID Info attribute comprises a Session ID field comprising a value of a session ID, and a session Media Access Control (MAC) address field comprising a peer-to-peer device address.

Example 34 includes the subject matter of Example 33, and optionally, wherein a combination of the session ID and the peer-to-peer device address is to uniquely identify the session.

Example 35 includes the subject matter of Example 33 or 34, and optionally, wherein the session MAC address field comprises a peer-to-peer device address of a peer-to-peer device, by which the session ID is assigned.

Example 36 includes the subject matter of any one of Examples 27-35, and optionally, wherein the session comprises an Application Service Platform (ASP) session between a first ASP of the first peer-to-peer device and a second ASP of the second peer-to-peer device.

Example 37 includes the subject matter of any one of Examples 27-36, and optionally, wherein the waiting timer comprises a 120 second timer.

Example 38 includes the subject matter of any one of Examples 27-37, and optionally, wherein the probe request comprises a unicast frame individually addressed to the second peer-to-peer device.

Example 39 includes a product comprising one or more tangible computer-readable non-transitory storage media comprising computer-executable instructions operable to, when executed by at least one computer processor, enable the at least one computer processor to implement operations at a first peer-to-peer device, the operations comprising setting a waiting timer to count a waiting period during a connection session setup of a session with a second peer-to-peer device; and during the waiting period, checking whether the second peer-to-peer device is in the connection session setup by transmitting a probe request to the second peer-to-peer device, the probe request comprising an Information (Info) attribute.

Example 40 includes the subject matter of Example 39, and optionally, wherein the operations comprise determining a failure of the connection session setup and stopping the waiting timer during the waiting period, if a probe response, which comprises the Info attribute, is not received from the second peer-to-peer device.

Example 41 includes the subject matter of Example 39 or 40, and optionally, wherein the operations comprise retransmitting the probe request during the waiting period, if a probe response, which comprises the Info attribute, is not received from the second peer-to-peer device.

Example 42 includes the subject matter of any one of Examples 39-41, and optionally, wherein the operations comprise determining the failure of the connection session setup and stopping the waiting timer during the waiting period, if no probe response is received from the second peer-to-peer device.

Example 43 includes the subject matter of any one of Examples 39-42, and optionally, wherein the operations comprise determining the failure of the connection session setup and stopping the waiting timer during the waiting period, if a probe response, which does not include the Info attribute, is received from the second peer-to-peer device.

Example 44 includes the subject matter of any one of Examples 39-43, and optionally, wherein the Info attribute comprises a Session Identifier (ID) Info attribute.

Example 45 includes the subject matter of Example 44, and optionally, wherein the Session ID Info attribute comprises a Session ID field comprising a value of a session ID, and a session Media Access Control (MAC) address field comprising a peer-to-peer device address.

Example 46 includes the subject matter of Example 45, and optionally, wherein a combination of the session ID and the peer-to-peer device address is to uniquely identify the session.

Example 47 includes the subject matter of Example 45 or 46, and optionally, wherein the session MAC address field comprises a peer-to-peer device address of a peer-to-peer device, by which the session ID is assigned.

Example 48 includes the subject matter of any one of Examples 39-47, and optionally, wherein the session comprises an Application Service Platform (ASP) session between a first ASP of the first peer-to-peer device and a second ASP of the second peer-to-peer device.

Example 49 includes the subject matter of any one of Examples 39-48, and optionally, wherein the waiting timer comprises a 120 second timer.

Example 50 includes the subject matter of any one of Examples 39-49, and optionally, wherein the probe request comprises a unicast frame individually addressed to the second peer-to-peer device.

Example 51 includes an apparatus of a first peer-to-peer device, the apparatus comprising means for setting a waiting timer to count a waiting period during a connection session setup of a session with a second peer-to-peer device; and means for, during the waiting period, checking whether the second peer-to-peer device is in the connection session setup by transmitting a probe request to the second peer-to-peer device, the probe request comprising an Information (Info) attribute.

Example 52 includes the subject matter of Example 51, and optionally, comprising means for determining a failure of the connection session setup and stopping the waiting timer during the waiting period, if a probe response, which comprises the Info attribute, is not received from the second peer-to-peer device.

Example 53 includes the subject matter of Example 51 or 52, and optionally, comprising means for retransmitting the probe request during the waiting period, if a probe response, which comprises the Info attribute, is not received from the second peer-to-peer device.

Example 54 includes the subject matter of any one of Examples 51-53, and optionally, comprising means for determining the failure of the connection session setup and stopping the waiting timer during the waiting period, if no probe response is received from the second peer-to-peer device.

Example 55 includes the subject matter of any one of Examples 51-54, and optionally, comprising means for determining the failure of the connection session setup and stopping the waiting timer during the waiting period, if a probe response, which does not include the Info attribute, is received from the second peer-to-peer device.

Example 56 includes the subject matter of any one of Examples 51-55, and optionally, wherein the Info attribute comprises a Session Identifier (ID) Info attribute.

Example 57 includes the subject matter of Example 56, and optionally, wherein the Session ID Info attribute comprises a Session ID field comprising a value of a session ID, and a session Media Access Control (MAC) address field comprising a peer-to-peer device address.

Example 58 includes the subject matter of Example 57, and optionally, wherein a combination of the session ID and the peer-to-peer device address is to uniquely identify the session.

Example 59 includes the subject matter of Example 57 or 58, and optionally, wherein the session MAC address field comprises a peer-to-peer device address of a peer-to-peer device, by which the session ID is assigned.

Example 60 includes the subject matter of any one of Examples 51-59, and optionally, wherein the session comprises an Application Service Platform (ASP) session between a first ASP of the first peer-to-peer device and a second ASP of the second peer-to-peer device.

Example 61 includes the subject matter of any one of Examples 51-60, and optionally, wherein the waiting timer comprises a 120 second timer.

Example 62 includes the subject matter of any one of Examples 51-61, and optionally, wherein the probe request comprises a unicast frame individually addressed to the second peer-to-peer device.

Example 63 includes an apparatus comprising circuitry and logic configured to cause a first peer-to-peer device to set a waiting timer to count a waiting period during a connection session setup of a session with a second peer-to-peer device; and during the waiting period, upon receipt of a probe request from the second peer-to-peer device comprising an Information (Info) attribute, transmit to the second peer-to-peer device a probe response, which comprises the Info attribute, when the first peer-to-peer device is still in the connection session setup.

Example 64 includes the subject matter of Example 63, and optionally, wherein the apparatus is configured to cause the first peer-to-peer device to, in response to the probe request, transmit to the second peer-to-peer device a probe response, which does not comprise the Info attribute, when the first peer-to-peer device is not in the connection session setup.

Example 65 includes the subject matter of Example 63, and optionally, wherein the apparatus is configured to cause the first peer-to-peer device to, in response to the probe request, select not to transmit the probe response, when the first peer-to-peer device is not in the connection session setup.

Example 66 includes the subject matter of any one of Examples 63-65, and optionally, wherein the Info attribute comprises a Session Identifier (ID) Info attribute.

Example 67 includes the subject matter of Example 66, and optionally, wherein the Session ID Info attribute comprises a Session ID field comprising a value of a session ID, and a session Media Access Control (MAC) address field comprising a peer-to-peer device address.

Example 68 includes the subject matter of Example 67, and optionally, wherein a combination of the session ID and the peer-to-peer device address is to uniquely identify the session.

Example 69 includes the subject matter of Example 67 or 68, and optionally, wherein the session MAC address field comprises a peer-to-peer device address of a peer-to-peer device, by which the session ID is assigned.

Example 70 includes the subject matter of any one of Examples 63-69, and optionally, wherein the session comprises an Application Service Platform (ASP) session between a first ASP of the first peer-to-peer device and a second ASP of the second peer-to-peer device.

Example 71 includes the subject matter of any one of Examples 63-70, and optionally, wherein the waiting timer comprises a 120 second timer.

Example 72 includes the subject matter of any one of Examples 63-71, and optionally, wherein the probe response comprises a unicast frame individually addressed to the second peer-to-peer device.

Example 73 includes the subject matter of any one of Examples 63-72, and optionally, comprising a radio.

Example 74 includes the subject matter of any one of Examples 63-73, and optionally, comprising one or more antennas, a memory and a processor.

Example 75 includes a system of wireless communication comprising a first peer-to-peer device, the first peer-to-peer device comprising one or more antennas; a radio; a memory; a processor; and a controller configured to cause the first peer-to-peer device to set a waiting timer to count a waiting period during a connection session setup of a session with a second peer-to-peer device; and during the waiting period, upon receipt of a probe request from the second peer-to-peer device comprising an Information (Info) attribute, transmit to the second peer-to-peer device a probe response, which comprises the Info attribute, when the first peer-to-peer device is still in the connection session setup.

Example 76 includes the subject matter of Example 75, and optionally, wherein the controller is configured to cause the first peer-to-peer device to, in response to the probe request, transmit to the second peer-to-peer device a probe response, which does not comprise the Info attribute, when the first peer-to-peer device is not in the connection session setup.

Example 77 includes the subject matter of Example 75, and optionally, wherein the controller is configured to cause the first peer-to-peer device to, in response to the probe request, select not to transmit the probe response, when the first peer-to-peer device is not in the connection session setup.

Example 78 includes the subject matter of any one of Examples 75-77, and optionally, wherein the Info attribute comprises a Session Identifier (ID) Info attribute.

Example 79 includes the subject matter of Example 78, and optionally, wherein the Session ID Info attribute comprises a Session ID field comprising a value of a session ID, and a session Media Access Control (MAC) address field comprising a peer-to-peer device address.

Example 80 includes the subject matter of Example 79, and optionally, wherein a combination of the session ID and the peer-to-peer device address is to uniquely identify the session.

Example 81 includes the subject matter of Example 79 or 80, and optionally, wherein the session MAC address field comprises a peer-to-peer device address of a peer-to-peer device, by which the session ID is assigned.

Example 82 includes the subject matter of any one of Examples 75-81, and optionally, wherein the session comprises an Application Service Platform (ASP) session between a first ASP of the first peer-to-peer device and a second ASP of the second peer-to-peer device.

Example 83 includes the subject matter of any one of Examples 75-82, and optionally, wherein the waiting timer comprises a 120 second timer.

Example 84 includes the subject matter of any one of Examples 75-83, and optionally, wherein the probe response comprises a unicast frame individually addressed to the second peer-to-peer device.

Example 85 includes a method to be performed at a first peer-to-peer device, the method comprising setting a waiting timer to count a waiting period during a connection session setup of a session with a second peer-to-peer device; and during the waiting period, upon receipt of a probe request from the second peer-to-peer device comprising an Information (Info) attribute, transmitting to the second peer-to-peer device a probe response, which comprises the Info attribute, when the first peer-to-peer device is still in the connection session setup.

Example 86 includes the subject matter of Example 85, and optionally, comprising, in response to the probe request, transmitting to the second peer-to-peer device a probe response, which does not comprise the Info attribute, when the first peer-to-peer device is not in the connection session setup.

Example 87 includes the subject matter of Example 85, and optionally, comprising, in response to the probe request, selecting not to transmit the probe response, when the first peer-to-peer device is not in the connection session setup.

Example 88 includes the subject matter of any one of Examples 85-87, and optionally, wherein the Info attribute comprises a Session Identifier (ID) Info attribute.

Example 89 includes the subject matter of Example 88, and optionally, wherein the Session ID Info attribute comprises a Session ID field comprising a value of a session ID, and a session Media Access Control (MAC) address field comprising a peer-to-peer device address.

Example 90 includes the subject matter of Example 89, and optionally, wherein a combination of the session ID and the peer-to-peer device address is to uniquely identify the session.

Example 91 includes the subject matter of Example 89 or 90, and optionally, wherein the session MAC address field comprises a peer-to-peer device address of a peer-to-peer device, by which the session ID is assigned.

Example 92 includes the subject matter of any one of Examples 85-91, and optionally, wherein the session comprises an Application Service Platform (ASP) session between a first ASP of the first peer-to-peer device and a second ASP of the second peer-to-peer device.

Example 93 includes the subject matter of any one of Examples 85-92, and optionally, wherein the waiting timer comprises a 120 second timer.

Example 94 includes the subject matter of any one of Examples 85-93, and optionally, wherein the probe response comprises a unicast frame individually addressed to the second peer-to-peer device.

Example 95 includes a product comprising one or more tangible computer-readable non-transitory storage media comprising computer-executable instructions operable to, when executed by at least one computer processor, enable the at least one computer processor to implement operations at a first peer-to-peer device, the operations comprising setting a waiting timer to count a waiting period during a connection session setup of a session with a second peer-to-peer device; and during the waiting period, upon receipt of a probe request from the second peer-to-peer device comprising an Information (Info) attribute, transmitting to the second peer-to-peer device a probe response, which comprises the Info attribute, when the first peer-to-peer device is still in the connection session setup.

Example 96 includes the subject matter of Example 95, and optionally, wherein the operations comprise, in response to the probe request, transmitting to the second peer-to-peer device a probe response, which does not comprise the Info attribute, when the first peer-to-peer device is not in the connection session setup.

Example 97 includes the subject matter of Example 95, and optionally, wherein the operations comprise, in response to the probe request, selecting not to transmit the probe response, when the first peer-to-peer device is not in the connection session setup.

Example 98 includes the subject matter of any one of Examples 95-97, and optionally, wherein the Info attribute comprises a Session Identifier (ID) Info attribute.

Example 99 includes the subject matter of Example 98, and optionally, wherein the Session ID Info attribute comprises a Session ID field comprising a value of a session ID, and a session Media Access Control (MAC) address field comprising a peer-to-peer device address.

Example 100 includes the subject matter of Example 99, and optionally, wherein a combination of the session ID and the peer-to-peer device address is to uniquely identify the session.

Example 101 includes the subject matter of Example 99 or 100, and optionally, wherein the session MAC address field comprises a peer-to-peer device address of a peer-to-peer device, by which the session ID is assigned.

Example 102 includes the subject matter of any one of Examples 95-101, and optionally, wherein the session comprises an Application Service Platform (ASP) session between a first ASP of the first peer-to-peer device and a second ASP of the second peer-to-peer device.

Example 103 includes the subject matter of any one of Examples 95-102, and optionally, wherein the waiting timer comprises a 120 second timer.

Example 104 includes the subject matter of any one of Examples 95-103, and optionally, wherein the probe response comprises a unicast frame individually addressed to the second peer-to-peer device.

Example 105 includes an apparatus of a first peer-to-peer device, the apparatus comprising means for setting a waiting timer to count a waiting period during a connection session setup of a session with a second peer-to-peer device; and means for, during the waiting period, upon receipt of a probe request from the second peer-to-peer device comprising an Information (Info) attribute, transmitting to the second peer-to-peer device a probe response, which comprises the Info attribute, when the first peer-to-peer device is still in the connection session setup.

Example 106 includes the subject matter of Example 105, and optionally, comprising means for, in response to the probe request, transmitting to the second peer-to-peer device a probe response, which does not comprise the Info attribute, when the first peer-to-peer device is not in the connection session setup.

Example 107 includes the subject matter of Example 105, and optionally, comprising means for, in response to the probe request, selecting not to transmit the probe response, when the first peer-to-peer device is not in the connection session setup.

Example 108 includes the subject matter of any one of Examples 105-107, and optionally, wherein the Info attribute comprises a Session Identifier (ID) Info attribute.

Example 109 includes the subject matter of Example 108, and optionally, wherein the Session ID Info attribute comprises a Session ID field comprising a value of a session ID, and a session Media Access Control (MAC) address field comprising a peer-to-peer device address.

Example 110 includes the subject matter of Example 109, and optionally, wherein a combination of the session ID and the peer-to-peer device address is to uniquely identify the session.

Example 111 includes the subject matter of Example 109 or 110, and optionally, wherein the session MAC address field comprises a peer-to-peer device address of a peer-to-peer device, by which the session ID is assigned.

Example 112 includes the subject matter of any one of Examples 105-111, and optionally, wherein the session comprises an Application Service Platform (ASP) session between a first ASP of the first peer-to-peer device and a second ASP of the second peer-to-peer device.

Example 113 includes the subject matter of any one of Examples 105-112, and optionally, wherein the waiting timer comprises a 120 second timer.

Example 114 includes the subject matter of any one of Examples 105-113, and optionally, wherein the probe response comprises a unicast frame individually addressed to the second peer-to-peer device.

Example 115 includes an apparatus comprising circuitry and logic configured to cause a first peer-to-peer device to generate a probe request comprising a Session Identifier (ID) Information (Info) attribute; and transmit the probe request to a second peer-to-peer device during a connection session setup of a session with the second peer-to-peer device.

Example 116 includes the subject matter of Example 115, and optionally, wherein the Session ID Info attribute comprises a Session ID field comprising a value of a session ID, and a session Media Access Control (MAC) address field comprising a peer-to-peer device address.

Example 117 includes the subject matter of Example 116, and optionally, wherein a combination of the session ID and the peer-to-peer device address is to uniquely identify the session.

Example 118 includes the subject matter of Example 116 or 117, and optionally, wherein the session MAC address field comprises a peer-to-peer device address of a peer-to-peer device, by which the session ID is assigned.

Example 119 includes the subject matter of any one of Examples 115-118, and optionally, wherein the session comprises an Application Service Platform (ASP) session between a first ASP of the first peer-to-peer device and a second ASP of the second peer-to-peer device.

Example 120 includes the subject matter of any one of Examples 115-119, and optionally, wherein the probe request comprises a unicast frame individually addressed to the second peer-to-peer device.

Example 121 includes the subject matter of any one of Examples 115-120, and optionally, comprising a radio.

Example 122 includes the subject matter of any one of Examples 115-121, and optionally, comprising one or more antennas, a memory and a processor.

Example 123 includes a system of wireless communication comprising a first peer-to-peer device, the first peer-to-peer device comprising one or more antennas; a radio; a memory; a processor; and a controller configured to cause the first peer-to-peer device to generate a probe request comprising a Session Identifier (ID) Information (Info) attribute; and transmit the probe request to a second peer-to-peer device during a connection session setup of a session with the second peer-to-peer device.

Example 124 includes the subject matter of Example 123, and optionally, wherein the Session ID Info attribute comprises a Session ID field comprising a value of a session ID, and a session Media Access Control (MAC) address field comprising a peer-to-peer device address.

Example 125 includes the subject matter of Example 124, and optionally, wherein a combination of the session ID and the peer-to-peer device address is to uniquely identify the session.

Example 126 includes the subject matter of Example 124 or 125, and optionally, wherein the session MAC address field comprises a peer-to-peer device address of a peer-to-peer device, by which the session ID is assigned.

Example 127 includes the subject matter of any one of Examples 123-126, and optionally, wherein the session comprises an Application Service Platform (ASP) session between a first ASP of the first peer-to-peer device and a second ASP of the second peer-to-peer device.

Example 128 includes the subject matter of any one of Examples 123-127, and optionally, wherein the probe request comprises a unicast frame individually addressed to the second peer-to-peer device.

Example 129 includes a method to be performed at a first peer-to-peer device, the method comprising generating a probe request comprising a Session Identifier (ID) Information (Info) attribute; and transmitting the probe request to a second peer-to-peer device during a connection session setup of a session with the second peer-to-peer device.

Example 130 includes the subject matter of Example 129, and optionally, wherein the Session ID Info attribute comprises a Session ID field comprising a value of a session ID, and a session Media Access Control (MAC) address field comprising a peer-to-peer device address.

Example 131 includes the subject matter of Example 130, and optionally, wherein a combination of the session ID and the peer-to-peer device address is to uniquely identify the session.

Example 132 includes the subject matter of Example 130 or 131, and optionally, wherein the session MAC address field comprises a peer-to-peer device address of a peer-to-peer device, by which the session ID is assigned.

Example 133 includes the subject matter of any one of Examples 129-132, and optionally, wherein the session comprises an Application Service Platform (ASP) session between a first ASP of the first peer-to-peer device and a second ASP of the second peer-to-peer device.

Example 134 includes the subject matter of any one of Examples 129-133, and optionally, wherein the probe request comprises a unicast frame individually addressed to the second peer-to-peer device.

Example 135 includes a product comprising one or more tangible computer-readable non-transitory storage media comprising computer-executable instructions operable to, when executed by at least one computer processor, enable the at least one computer processor to implement operations at a first peer-to-peer device, the operations comprising generating a probe request comprising a Session Identifier (ID) Information (Info) attribute; and transmitting the probe request to a second peer-to-peer device during a connection session setup of a session with the second peer-to-peer device.

Example 136 includes the subject matter of Example 135, and optionally, wherein the Session ID Info attribute comprises a Session ID field comprising a value of a session ID, and a session Media Access Control (MAC) address field comprising a peer-to-peer device address.

Example 137 includes the subject matter of Example 136, and optionally, wherein a combination of the session ID and the peer-to-peer device address is to uniquely identify the session.

Example 138 includes the subject matter of Example 136 or 137, and optionally, wherein the session MAC address field comprises a peer-to-peer device address of a peer-to-peer device, by which the session ID is assigned.

Example 139 includes the subject matter of any one of Examples 135-138, and optionally, wherein the session comprises an Application Service Platform (ASP) session between a first ASP of the first peer-to-peer device and a second ASP of the second peer-to-peer device.

Example 140 includes the subject matter of any one of Examples 135-139, and optionally, wherein the probe request comprises a unicast frame individually addressed to the second peer-to-peer device.

Example 141 includes an apparatus of a first peer-to-peer device, the apparatus comprising means for generating a probe request comprising a Session Identifier (ID) Information (Info) attribute; and means for transmitting the probe request to a second peer-to-peer device during a connection session setup of a session with the second peer-to-peer device.

Example 142 includes the subject matter of Example 141, and optionally, wherein the Session ID Info attribute comprises a Session ID field comprising a value of a session ID, and a session Media Access Control (MAC) address field comprising a peer-to-peer device address.

Example 143 includes the subject matter of Example 142, and optionally, wherein a combination of the session ID and the peer-to-peer device address is to uniquely identify the session.

Example 144 includes the subject matter of Example 142 or 143, and optionally, wherein the session MAC address field comprises a peer-to-peer device address of a peer-to-peer device, by which the session ID is assigned.

Example 145 includes the subject matter of any one of Examples 141-144, and optionally, wherein the session comprises an Application Service Platform (ASP) session between a first ASP of the first peer-to-peer device and a second ASP of the second peer-to-peer device.

Example 146 includes the subject matter of any one of Examples 141-145, and optionally, wherein the probe request comprises a unicast frame individually addressed to the second peer-to-peer device.

Example 147 includes an apparatus comprising circuitry and logic configured to cause a first peer-to-peer device to process a probe request received from a second peer-to-peer device during a connection session setup of a session with the second peer-to-peer device, the probe request comprising a Session Identifier (ID) Information (Info) attribute; and transmit a probe response to the second peer-to-peer device in response to the probe request.

Example 148 includes the subject matter of Example 147, and optionally, wherein the Session ID Info attribute comprises a Session ID field comprising a value of a session ID, and a session Media Access Control (MAC) address field comprising a peer-to-peer device address.

Example 149 includes the subject matter of Example 148, and optionally, wherein a combination of the session ID and the peer-to-peer device address is to uniquely identify the session.

Example 150 includes the subject matter of Example 148 or 149, and optionally, wherein the session MAC address field comprises a peer-to-peer device address of a peer-to-peer device, by which the session ID is assigned.

Example 151 includes the subject matter of any one of Examples 147-150, and optionally, wherein the session comprises an Application Service Platform (ASP) session between a first ASP of the first peer-to-peer device and a second ASP of the second peer-to-peer device.

Example 152 includes the subject matter of any one of Examples 147-151, and optionally, wherein the probe response comprises a unicast frame individually addressed to the second peer-to-peer device.

Example 153 includes the subject matter of any one of Examples 147-152, and optionally, comprising a radio.

Example 154 includes the subject matter of any one of Examples 147-153, and optionally, comprising one or more antennas, a memory and a processor.

Example 155 includes a system of wireless communication comprising a first peer-to-peer device, the first peer-to-peer device comprising one or more antennas; a radio; a memory; a processor; and a controller configured to cause the first peer-to-peer device to process a probe request received from a second peer-to-peer device during a connection session setup of a session with the second peer-to-peer device, the probe request comprising a Session Identifier (ID) Information (Info) attribute; and transmit a probe response to the second peer-to-peer device in response to the probe request.

Example 156 includes the subject matter of Example 155, and optionally, wherein the Session ID Info attribute comprises a Session ID field comprising a value of a session ID, and a session Media Access Control (MAC) address field comprising a peer-to-peer device address.

Example 157 includes the subject matter of Example 156, and optionally, wherein a combination of the session ID and the peer-to-peer device address is to uniquely identify the session.

Example 158 includes the subject matter of Example 156 or 157, and optionally, wherein the session MAC address field comprises a peer-to-peer device address of a peer-to-peer device, by which the session ID is assigned.

Example 159 includes the subject matter of any one of Examples 155-158, and optionally, wherein the session comprises an Application Service Platform (ASP) session between a first ASP of the first peer-to-peer device and a second ASP of the second peer-to-peer device.

Example 160 includes the subject matter of any one of Examples 155-159, and optionally, wherein the probe response comprises a unicast frame individually addressed to the second peer-to-peer device.

Example 161 includes a method to be performed at a first peer-to-peer device, the method comprising processing a probe request received from a second peer-to-peer device during a connection session setup of a session with the second peer-to-peer device, the probe request comprising a Session Identifier (ID) Information (Info) attribute; and transmitting a probe response to the second peer-to-peer device in response to the probe request.

Example 162 includes the subject matter of Example 161, and optionally, wherein the Session ID Info attribute comprises a Session ID field comprising a value of a session ID, and a session Media Access Control (MAC) address field comprising a peer-to-peer device address.

Example 163 includes the subject matter of Example 162, and optionally, wherein a combination of the session ID and the peer-to-peer device address is to uniquely identify the session.

Example 164 includes the subject matter of Example 162 or 163, and optionally, wherein the session MAC address field comprises a peer-to-peer device address of a peer-to-peer device, by which the session ID is assigned.

Example 165 includes the subject matter of any one of Examples 161-164, and optionally, wherein the session comprises an Application Service Platform (ASP) session between a first ASP of the first peer-to-peer device and a second ASP of the second peer-to-peer device.

Example 166 includes the subject matter of any one of Examples 161-165, and optionally, wherein the probe response comprises a unicast frame individually addressed to the second peer-to-peer device.

Example 167 includes a product comprising one or more tangible computer-readable non-transitory storage media comprising computer-executable instructions operable to, when executed by at least one computer processor, enable the at least one computer processor to implement operations at a first peer-to-peer device, the operations comprising processing a probe request received from a second peer-to-peer device during a connection session setup of a session with the second peer-to-peer device, the probe request comprising a Session Identifier (ID) Information (Info) attribute; and transmitting a probe response to the second peer-to-peer device in response to the probe request.

Example 168 includes the subject matter of Example 167, and optionally, wherein the Session ID Info attribute comprises a Session ID field comprising a value of a session ID, and a session Media Access Control (MAC) address field comprising a peer-to-peer device address.

Example 169 includes the subject matter of Example 168, and optionally, wherein a combination of the session ID and the peer-to-peer device address is to uniquely identify the session.

Example 170 includes the subject matter of Example 168 or 169, and optionally, wherein the session MAC address field comprises a peer-to-peer device address of a peer-to-peer device, by which the session ID is assigned.

Example 171 includes the subject matter of any one of Examples 167-170, and optionally, wherein the session comprises an Application Service Platform (ASP) session between a first ASP of the first peer-to-peer device and a second ASP of the second peer-to-peer device.

Example 172 includes the subject matter of any one of Examples 167-171, and optionally, wherein the probe response comprises a unicast frame individually addressed to the second peer-to-peer device.

Example 173 includes an apparatus of a first peer-to-peer device, the apparatus comprising means for processing a probe request received from a second peer-to-peer device during a connection session setup of a session with the second peer-to-peer device, the probe request comprising a Session Identifier (ID) Information (Info) attribute; and means for transmitting a probe response to the second peer-to-peer device in response to the probe request.

Example 174 includes the subject matter of Example 173, and optionally, wherein the Session ID Info attribute comprises a Session ID field comprising a value of a session ID, and a session Media Access Control (MAC) address field comprising a peer-to-peer device address.

Example 175 includes the subject matter of Example 174, and optionally, wherein a combination of the session ID and the peer-to-peer device address is to uniquely identify the session.

Example 176 includes the subject matter of Example 174 or 175, and optionally, wherein the session MAC address field comprises a peer-to-peer device address of a peer-to-peer device, by which the session ID is assigned.

Example 177 includes the subject matter of any one of Examples 173-176, and optionally, wherein the session comprises an Application Service Platform (ASP) session between a first ASP of the first peer-to-peer device and a second ASP of the second peer-to-peer device.

Example 178 includes the subject matter of any one of Examples 173-177, and optionally, wherein the probe response comprises a unicast frame individually addressed to the second peer-to-peer device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a first peer-to-peer device to:
    initiate a connection session setup of a session between the first peer-to-peer device and a second peer-to-peer device by exchanging a discovery request and a discovery response between the first peer-to-peer device and the second peer-to-peer device, the discovery request and the discovery response comprising a Session Identifier (ID) Information (Info) attribute comprising a Session ID field comprising a value of a session ID, and a session Media Access Control (MAC) address field comprising a peer-to-peer device address;
    set a waiting timer to count a waiting period during the connection session setup; and
    during the waiting period, check whether the second peer-to-peer device is in said connection session setup by transmitting a probe request to the second peer-to-peer device, the probe request comprising the Session ID Info attribute comprising a same value of the session ID and a same peer-to-peer device address as in the discovery request and the discovery response.

2. The apparatus of claim 1 configured to allow the first peer-to-peer device to determine a failure of the connection session setup and stop the waiting timer during the waiting period, if a probe response, which comprises the Session ID Info attribute, is not received from the second peer-to-peer device.

3. The apparatus of claim 1 configured to cause the first peer-to-peer device to retransmit the probe request during the waiting period, if a probe response, which comprises the Session ID Info attribute, is not received from the second peer-to-peer device.

4. The apparatus of claim 1 configured to allow the first peer-to-peer device to determine a failure of the connection session setup and stop the waiting timer during the waiting period, if no probe response is received from the second peer-to-peer device.

5. The apparatus of claim 1 configured to allow the first peer-to-peer device to determine a failure of the connection session setup and stop the waiting timer during the waiting period, if a probe response, which does not include the Session ID Info attribute, is received from the second peer-to-peer device.

6. The apparatus of claim 1 configured to cause the first peer-to-peer device to transmit the discovery request to the second peer-to-peer device, and set said waiting timer based on receipt of the discovery response.

7. The apparatus of claim 1, wherein a combination of the session ID and the peer-to-peer device address is to uniquely identify said session.

8. The apparatus of claim 1, wherein the session MAC address field comprises a peer-to-peer device address of a peer-to-peer device, by which the session ID is assigned.

9. The apparatus of claim 1, wherein the session comprises an Application Service Platform (ASP) session between a first ASP of the first peer-to-peer device and a second ASP of the second peer-to-peer device.

10. The apparatus of claim 1, wherein the waiting timer comprises a 120 second timer.

11. The apparatus of claim 1, wherein the probe request comprises a unicast frame individually addressed to the second peer-to-peer device.

12. The apparatus of claim 1 comprising a radio.

13. The apparatus of claim 1 comprising one or more antennas, a memory and a processor.

14. An apparatus comprising circuitry and logic configured to cause a first peer-to-peer device to:
    initiate a connection session setup of a session between the first peer-to-peer device and a second peer-to-peer device by exchanging a discovery request and a discovery response between the first peer-to-peer device and the second peer-to-peer device, the discovery request and the discovery response comprising a Session Identifier (ID) Information (Info) attribute comprising a Session ID field comprising value of a session II), and a session Media Access Control (MAC) address field comprising a peer-to-peer device address;
    set a waiting timer to count a waiting period during the connection session setup; and
    during the waiting period, based on receipt of a probe request from the second peer-to-peer device comprising the Session ID Info attribute comprising a same value of the session ID and a same peer-to-peer device address as in the discovery request and the discovery response, transmit to the second peer-to-peer device a probe response, which comprises the Session ID Info attribute, when the first peer-to-peer device is still in the connection session setup.

15. The apparatus of claim 14 configured to cause the first peer-to-peer device to, in response to the probe request, transmit to the second peer-to-peer device a probe response, which does not comprise the Session ID Info attribute, when the first peer-to-peer device is not in the connection session setup.

16. The apparatus of claim 14 configured to cause the first peer-to-peer device to, in response to the probe request, select not to transmit the probe response, when the first peer-to-peer device is not in the connection session setup.

17. The apparatus of claim 14 configured to cause the first peer-to-peer device to set said waiting timer based on receipt of the discovery request from the second peer-to-peer device.

18. The apparatus of claim 14, wherein a combination of the session ID and the peer-to-peer device address is to uniquely identify said session.

19. The apparatus of claim 14, wherein the session comprises an Application Service Platform (ASP) session between a first ASP of the first peer-to-peer device and a second ASP of the second peer-to-peer device.

20. The apparatus of claim 14 comprising one or more antennas, a memory and a processor.

21. A product comprising one or more tangible computer-readable non-transitory storage media comprising computer-executable instructions operable to, when executed by at least one processor, enable the at least one processor to cause a first peer-to-peer device to:
   initiate a connection session setup of a session between the first peer-to-peer device and a second peer-to-peer device by exchanging a discovery request and a discovery response between the first peer-to-peer device and the second peer-to-peer device, the discovery request and the discovery response comprising a Session Identifier (ID) Information (Info) attribute comprising a Session ID field comprising a value of a session ID, and a session Media Access Control (MAC) address field comprising a peer-to-peer device address;
   generate a probe request comprising the Session ID Info attribute comprising a same value of the session ID and a same peer-to-peer device address as in the discovery request and the discovery response; and
   transmit the probe request to the second peer-to-peer device during the connection session setup.

22. The product of claim 21, wherein a combination of the session ID and the peer-to-peer device address is to uniquely identify said session.

23. A product comprising one or more tangible computer-readable non-transitory storage media comprising computer-executable instructions operable to, when executed by at least one processor, enable the at least one processor to cause a first peer-to-peer device to:
   initiate a connection session setup of a session between the first peer-to-peer device and a second peer-to-peer device by exchanging a discovery request and a discovery response between the first peer-to-peer device and the second peer-to-peer device, the discovery request and the discovery response comprising a Session Identifier (ID) Information (Info) attribute comprising a Session ID field comprising a value of a session ID, and a session Media Access Control (MAC) address field comprising a peer-to-peer device address;
   process a probe request received from the second peer-to-peer device during the connection session setup, the probe request comprising the Session ID Info attribute comprising a same value of the session ID and a same peer-to-peer device address as in the discovery request and the discovery response; and
   transmit a probe response to the second peer-to-peer device in response to the probe request.

24. The product of claim 23, wherein the session comprises an Application Service Platform (ASP) session between a first ASP of the first peer-to-peer device and a second ASP of the second peer-to-peer device.

\* \* \* \* \*

UNITED STATES PATENT AND TRADEMARK OFFICE
CERTIFICATE OF CORRECTION

PATENT NO. : 10,299,302 B2
APPLICATION NO. : 15/199485
DATED : May 21, 2019
INVENTOR(S) : Emily H. Qi et al.

Page 1 of 1

It is certified that error appears in the above-identified patent and that said Letters Patent is hereby corrected as shown below:

In the Claims

In Column 42, Line 38, in Claim 14, delete "comprising value" and insert -- comprising a value --, therefor.

In Column 42, Line 38, in Claim 14, delete "a session II), and" and insert -- a session ID, and --, therefor.

Signed and Sealed this
Sixth Day of August, 2019

Andrei Iancu
*Director of the United States Patent and Trademark Office*